United States Patent
Åkesson et al.

(10) Patent No.: US 12,193,106 B2
(45) Date of Patent: Jan. 7, 2025

(54) ADAPTIVE SERVICE AREAS FOR MULTICAST SESSION CONTINUITY

(71) Applicant: Telefonaktiebolaget LM Ericsson (publ), Stockholm (SE)

(72) Inventors: Joakim Åkesson, Landvetter (SE); Erik Stare, Sollentuna (SE); Jie Ling, Shanghai (CN)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 226 days.

(21) Appl. No.: 17/785,535

(22) PCT Filed: Dec. 11, 2020

(86) PCT No.: PCT/EP2020/085756
§ 371 (c)(1),
(2) Date: Jun. 15, 2022

(87) PCT Pub. No.: WO2021/122370
PCT Pub. Date: Jun. 24, 2021

(65) Prior Publication Data
US 2023/0011492 A1    Jan. 12, 2023

(30) Foreign Application Priority Data
Dec. 17, 2019  (WO) ............... PCT/CN2019/125923

(51) Int. Cl.
*H04H 20/71*   (2008.01)
*H04W 76/40*   (2018.01)
*H04W 92/20*   (2009.01)

(52) U.S. Cl.
CPC ............ *H04W 76/40* (2018.02); *H04W 92/20* (2013.01)

(58) Field of Classification Search
CPC ..... H04W 76/40; H04W 92/20; H04W 72/30; H04W 76/11; H04W 4/10; H04W 4/06
(Continued)

(56) References Cited

U.S. PATENT DOCUMENTS 10,492,107 B2 * 11/2019 Park ...................... H04W 36/22
2012/0307707 A1   12/2012 Wang
(Continued)

FOREIGN PATENT DOCUMENTS

WO       2016119212 A1    8/2016

OTHER PUBLICATIONS

Author Unknown, "Technical Specification Group Services and System Aspects; Group Communication System Enablers for LTE (GCSE_LTE); Stage 2 (Release 15)," Technical Specification 23.468, Version 15.1.0, Sep. 2019, 3GPP Organizational Partners, 32 pages.
(Continued)

*Primary Examiner* — Chuong T Ho
(74) *Attorney, Agent, or Firm* — Weisberg I.P. Law, P.A.

(57) ABSTRACT

Systems and methods are disclosed herein for providing adaptive service areas for multicast session continuity. Embodiments of a method performed by a radio access node in a Radio Access Network (RAN) are disclosed. Such embodiments introduce mobility of User Equipments (UEs) participating in a multicast/broadcast service, which is managed by the RAN. This means that the broadcast area will dynamically adapt as participating UEs move and/or radio conditions change.

29 Claims, 12 Drawing Sheets

(58) Field of Classification Search
USPC .......................................................... 370/312
See application file for complete search history.

(56) References Cited

U.S. PATENT DOCUMENTS

| | | | | |
|---|---|---|---|---|
| 2015/0195684 | A1* | 7/2015 | Lohmar | H04W 76/11 |
| | | | | 370/312 |
| 2016/0302119 | A1* | 10/2016 | Chen | H04W 76/23 |
| 2017/0086247 | A1* | 3/2017 | El Khayat | H04W 76/38 |
| 2017/0325140 | A1* | 11/2017 | Da Silva | H04W 36/302 |
| 2018/0124648 | A1* | 5/2018 | Park | H04W 36/0005 |
| 2018/0124656 | A1* | 5/2018 | Park | H04W 36/36 |
| 2018/0139665 | A1* | 5/2018 | Park | H04W 36/0007 |
| 2018/0242387 | A1* | 8/2018 | El Khayat | H04W 76/12 |
| 2019/0174271 | A1* | 6/2019 | Fujishiro | H04W 88/184 |
| 2020/0120570 | A1* | 4/2020 | Youn | H04W 76/11 |
| 2021/0234717 | A1* | 7/2021 | Speicher | H04W 72/30 |

OTHER PUBLICATIONS

Author Unknown, "Technical Specification Group Radio Access Network; Evolved Universal Terrestrial Radio Access (E-UTRA) and Evolved Universal Terrestrial Radio Access Network (E-UTRAN); Overall description; Stage 2 (Release 15)," Technical Specification 36.300, Version 15.1.0, Mar. 2018, 3GPP Organizational Partners, 341 pages.

International Search Report and Written Opinion for International Patent Application No. PCT/EP2020/085756, mailed Feb. 10, 2021, 15 pages.

International Preliminary Report on Patentability for International Patent Application No. PCT/EP2020/085756, mailed Mar. 21, 2022, 18 pages.

* cited by examiner

ADAPTIVE SERVICE AREAS FOR MULTICAST SESSION CONTINUITY

This application is a 35 U.S.C. § 371 national phase filing of International Application No. PCT/EP2020/085756, filed Dec. 11, 2020, which claims the benefit of International Application No. PCT/CN2019/125923, filed Dec. 17, 2019, the disclosures of which are incorporated herein by reference in their entireties.

TECHNICAL FIELD

The present disclosure relates to providing multicast session continuity for participants of a Group Communication Service (GCS), such as Mission-Critical Push-to-Talk (MCPTT).

BACKGROUND

Enhanced Multimedia Broadcast/Multicast Service (eMBMS) was initially specified for Long Term Evolution (LTE) in Third Generation Partnership Project (3GPP) Rel 8. eMBMS was initially targeted for media broadcasting services. Under eMBMS, a broadcast is sent to an area identified by one or more Service Area Identifiers (SAIs), such as illustrated in FIG. 1.

FIG. 1 illustrates relationships between broadcast area, service areas, and Multimedia Broadcast Single Frequency Network (MBSFN) areas for LTE eMBMS. In LTE eMBMS, a broadcast service is generally started in a service area identified by an SAI. It could also be started in a larger broadcast area, identified by a list of SAIs. Another option is to start the service in an area identified by one or a list of cells.

The broadcast service (and/or bearers of the broadcast service) is identified with a Temporary Mobile Group Identity (TMGI). Under eMBMS, each bearer of the broadcast service is statically coupled to the broadcast area, regardless of where the receiving User Equipment (UE) may be located (although it is possible to request modifications of the bearer, including the covered area). Compare this with a unicast Evolved Packet System (EPS) bearer—where mobility management procedures are used to move the bearer between Core and Radio Access Network (RAN) nodes, following the UE.

FIG. 2 is a schematic block diagram of a traditional EPS architecture having a Group Communication System Enabler (GCSE) to deploy eMBMS. FIG. 3 is a schematic block diagram of LTE eMBMS user plane protocol stacks for Mission-Critical Push-to-Talk (MCPTT) services. In 3GPP Rel 12, GCSE was specified, which allows an application to use unicast communication, broadcast communication, or a combination of these to reach the participants of a Group Communication Service (GCS), such as MCPTT.

Legacy (e.g., LTE based eMBMS with GCSE architecture) procedures for seamless transition between unicast and broadcast transmission are specified in TS 23.468, section 5.3.3.2. The procedure is dependent on the application client determining if coverage is poor (e.g., to take proactive make-before-break measures). When detecting poor conditions the client shall signal to the application server that it instead wants to be served via unicast. However, it is challenging to reliably detect such poor conditions that require a transition to unicast. In addition, a UE handover or cell reselection to a cell not providing the eMBMS service may occur. Since signaling is done on application level all the way to the application server—independent of actual lower layer mobility decisions—it is very challenging to avoid session interrupts in these scenarios. These scenarios may occur often and result in frequent loss of audio, not acceptable for a mission critical service.

Another problem is that the service areas used for eMBMS are statically defined at the start of an eMBMS service (although there are procedures that allow for some level of modifications, as discussed above). Transmissions therefor often become inefficient because the service may be transmitted in cells where no (or very few) users are present.

Another issue under LTE based eMBMS is the bearer establishment for downlink and/or Mobile Terminated (MT) traffic for a UE in RRC Idle. A UE in RRC Idle must monitor the Tracking Area (TA) it is camping on when doing cell reselections from one cell to another. If it is changing TA it needs to report this via Tracking Area Update (TAU) to the Mobility Management Entity (MME) in the Evolved Packet Core (EPC). When the network needs to establish a bearer for MT traffic it uses this TA information to page and/or locate the UE and then an End-to-End (E2E) bearer can be (initially) established through the currently serving cell (then following the UE, as described above).

Similarly, a user that has affiliated to a GCSE service needs to report its SAI location but in this case to the application layer—to the GCS Application Server (AS) (e.g., an MCPTT server). The GCS AS (e.g., MCPTT server) uses this location information to establish unicast and/or broadcast bearers where the group members are currently located (e.g., one broadcast bearer may target users 1-5, another broadcast bearer may target users 6-8 while users 9-10 may get individual unicast bearers, depending on reported UE locations).

If a UE moves out of a broadcast area the GCS client (hosted by the UE) should preferably proactively report this to perform the make-before-break procedure specified in TS 23.468, section 5.3.3.2. This may be very challenging and is often not possible. Instead, the client often reports when it has moved out of the area and moved into a cell that does not belong to the broadcast area where the UE was listening to the broadcast bearer (e.g., identified by a TMGI). This triggers the break-before-make procedure, TS 23.468, 5.3.3.3, resulting in a service interrupt.

SUMMARY

Systems and methods are disclosed herein for providing adaptive service areas for multicast session continuity. Embodiments of a method performed by a radio access node in a Radio Access Network (RAN) are disclosed. Such embodiments introduce mobility of User Equipment (UEs) participating in a multicast/broadcast service, which is managed by the RAN. This means that the broadcast area will dynamically adapt as participating UEs move and/or radio conditions change.

Two approaches are proposed for fast and seamless addition of new cells to synchronized multicast transmissions. Under a first approach, radio access nodes (e.g., New Radio Base Stations (gNBs)) in a multicast transmission session always pro-actively signal, to all known neighbors (or neighbors most likely to be impacted, based on, e.g., cell location or collected statistics on handover probability), information about the service (e.g., session information) so that these radio access nodes can join the multicast stream (e.g., an Internet Protocol (IP) Multicast stream) of the multicast transmission session ahead of the need to contribute to a transmission. Under a second approach, when a new radio access node joins the multicast transmission session, a neighboring radio access node already in the multicast transmission session initiates packet forwarding until the new radio access node acquires the multicast stream (e.g., the IP Multicast stream) used to deliver the service.

In this manner, embodiments of the present disclosure move mobility management of the multicast/broadcast service from the application layer (e.g., Group Communication System Enabler (GCSE)) to RAN. This provides support for seamless mobility and session continuity for services requiring high Quality of Service (QoS), such as Mission Critical Group Communication (MCGC). In addition, resource efficiency is enhanced by only transmitting when and where there are UEs participating in the service. Robust delivery of the service is provided by supporting Single Frequency Network (SFN) synchronized transmissions from multiple participating radio base stations/cells/beams, which may be dynamically assigned.

In some embodiments, a method performed by a first radio access node (e.g., gNB1) in a RAN for providing adaptive service areas in a multicast transmission session is provided. The method comprises participating in a multicast transmission session, comprising a multicast stream transmitted at least by the first radio access node to one or more UE in a first cell; and providing a preparation notification to a second radio access node (e.g., gNB2) neighboring the first radio access node, the preparation notification comprising session information for the multicast transmission session.

In some embodiments, a method performed by a first radio access node (e.g., gNB1) in a RAN for providing adaptive service areas in a multicast transmission session is provided. The method comprises participating in a multicast transmission session, comprising a multicast stream transmitted at least by the first radio access node to one or more UE in a first cell; forwarding service packets of the multicast stream to a second radio access node (e.g., gNB2) neighboring the first radio access node; and providing a preparation notification to the second radio access node, the preparation notification comprising session information for the multicast transmission session.

In some embodiments, a method performed by a second radio access node (e.g., gNB2) in a RAN for adaptively joining a multicast stream is provided. The method comprises receiving a preparation notification from a neighboring first radio access node (e.g., gNB1) in the RAN, the preparation notification comprising session information for a multicast transmission session having a multicast stream transmitted at least by the first radio access node in a first cell; joining the multicast transmission session using the session information; and transmitting the multicast stream to one or more UE in a second cell of the second radio access node.

In some embodiments, a method performed by a second radio access node (e.g., gNB2) in a RAN for adaptively joining a multicast stream is provided. The method comprises receiving a preparation notification from a neighboring first radio access node (e.g., gNB1) in the RAN, the preparation notification comprising session information for a multicast transmission session having a multicast stream transmitted at least by the first radio access node in a first cell; joining the multicast transmission session using the session information in response to receiving the preparation notification; and transmitting the multicast stream to one or more UE in a second cell of the second radio access node in response to receiving the preparation notification.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

Figure 1:
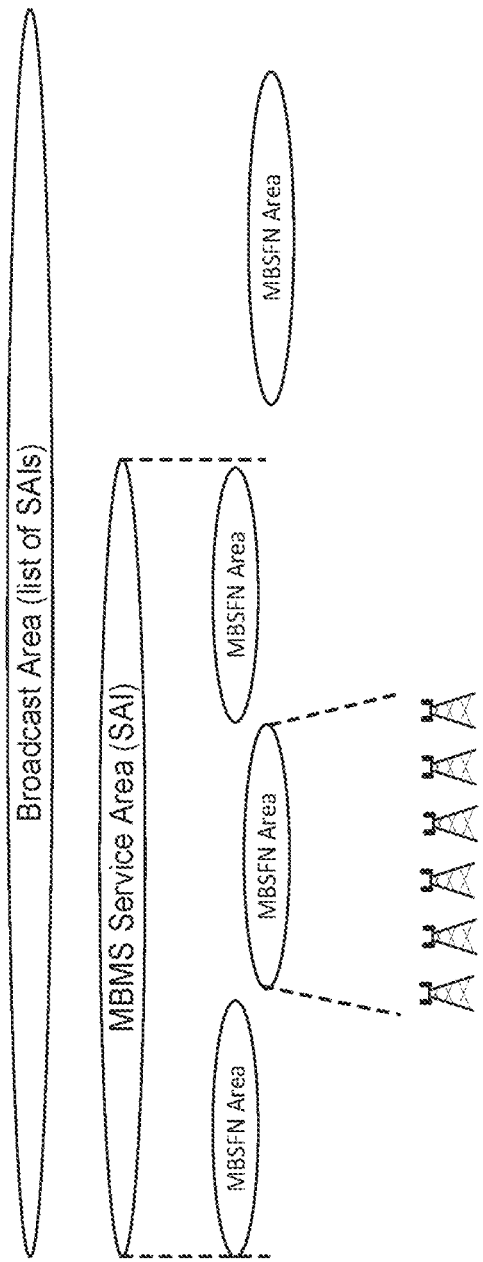
FIG. 1 illustrates relationships between broadcast area, service areas, and Multimedia Broadcast Single Frequency Network (MBSFN) areas for Long Term Evolution (LTE) Enhanced Multimedia Broadcast/Multicast Service (eMBMS)

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Radio Node: As used herein, a "radio node" is either a radio access node or a wireless communication device.

Radio Access Node: As used herein, a "radio access node" or "radio network node" or "radio access network node" is any node in a Radio Access Network (RAN) of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an Enhanced or Evolved Node B (eNB) in a 3GPP Long Term Evolution (LTE) network), a high-power or macro base station, a low-power base station (e.g., a micro base station, a pico base station, a home eNB, or the like), a relay node, a network node that implements part of the functionality of a base station or a network node that implements a gNB Distributed Unit (gNB-DU) or a network node that implements part of the functionality of some other type of radio access node.

Core Network Node: As used herein, a "core network node" is any type of node in a core network or any node that implements a core network function. Some examples of a core network node include, e.g., a Mobility Management Entity (MME), a Packet Data Network Gateway (P-GW), a Service Capability Exposure Function (SCEF), a Home Subscriber Server (HSS), or the like. Some other examples of a core network node include a node implementing a Access and Mobility Management Function (AMF), a User Plane Function (UPF), a Session Management Function (SMF), an Authentication Server Function (AUSF), a Network Slice Selection Function (NSSF), a Network Exposure Function (NEF), a Network Function (NF) Repository Function (NRF), a Policy Control Function (PCF), a Unified Data Management (UDM), or the like.

Communication Device: As used herein, a "communication device" is any type of device that has access to an access network. Some examples of a communication device include, but are not limited to: mobile phone, smart phone, sensor device, meter, vehicle, household appliance, medical appliance, media player, camera, or any type of consumer electronic, for instance, but not limited to, a television, radio, lighting arrangement, tablet computer, laptop, or Personal Computer (PC). The communication device may be a portable, hand-held, computer-comprised, or vehicle-mounted mobile device, enabled to communicate voice and/or data via a wireless or wireline connection.

Wireless Communication Device: One type of communication device is a wireless communication device, which may be any type of wireless device that has access to (i.e., is served by) a wireless network (e.g., a cellular network). Some examples of a wireless communication device include, but are not limited to: a User Equipment device (UE) in a 3GPP network, a Machine Type Communication (MTC) device, and an Internet of Things (IoT) device. Such wireless communication devices may be, or may be integrated into, a mobile phone, smart phone, sensor device, meter, vehicle, household appliance, medical appliance, media player, camera, or any type of consumer electronic, for instance, but not limited to, a television, radio, lighting arrangement, tablet computer, laptop, or PC. The wireless communication device may be a portable, hand-held, computer-comprised, or vehicle-mounted mobile device, enabled to communicate voice and/or data via a wireless connection.

Network Node: As used herein, a "network node" is any node that is either part of the RAN or the core network of a cellular communications network/system.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell"; however, particularly with respect to 5G NR concepts, beams may be used instead of cells and, as such, it is important to note that the concepts described herein are equally applicable to both cells and beams.

Systems and methods are disclosed herein for providing adaptive service areas for multicast session continuity. Embodiments of a method performed by a radio access node in a RAN are disclosed. Such embodiments introduce mobility of UEs participating in a multicast/broadcast service, which is managed by the RAN. This means that the broadcast area will dynamically adapt as participating UEs move and/or radio conditions change.

Two approaches are proposed for fast and seamless addition of new cells to synchronized multicast transmissions. Under a first approach, radio access nodes (e.g., gNBs) in a multicast transmission session always pro-actively signal, to all known neighbors (or neighbors most likely to be impacted, based on, e.g., cell location or collected statistics on handover probability), information about the service (e.g., session information) so that these radio access nodes can join the multicast stream (e.g., an Internet Protocol (IP) Multicast stream) of the multicast transmission session ahead of the need to contribute to a transmission. Under a second approach, when a new radio access node joins the multicast transmission session, a neighboring radio access node already in the multicast transmission session initiates packet forwarding until the new radio access node acquires the multicast stream (e.g., the IP Multicast stream) used to deliver the service.

In this manner, embodiments of the present disclosure move mobility management of the multicast/broadcast service from the application layer (e.g., Group Communication System Enabler (GCSE)) to RAN. This provides support for seamless mobility and session continuity for services requiring high Quality of Service (QoS), such as Mission Critical Group Communication (MCGC). In addition, resource efficiency is enhanced by only transmitting when and where there are UEs participating in the service. Robust delivery of the service is provided by supporting Single Frequency Network (SFN) synchronized transmissions from multiple participating radio base stations/cells/beams, which may be dynamically assigned.

Figure 4:
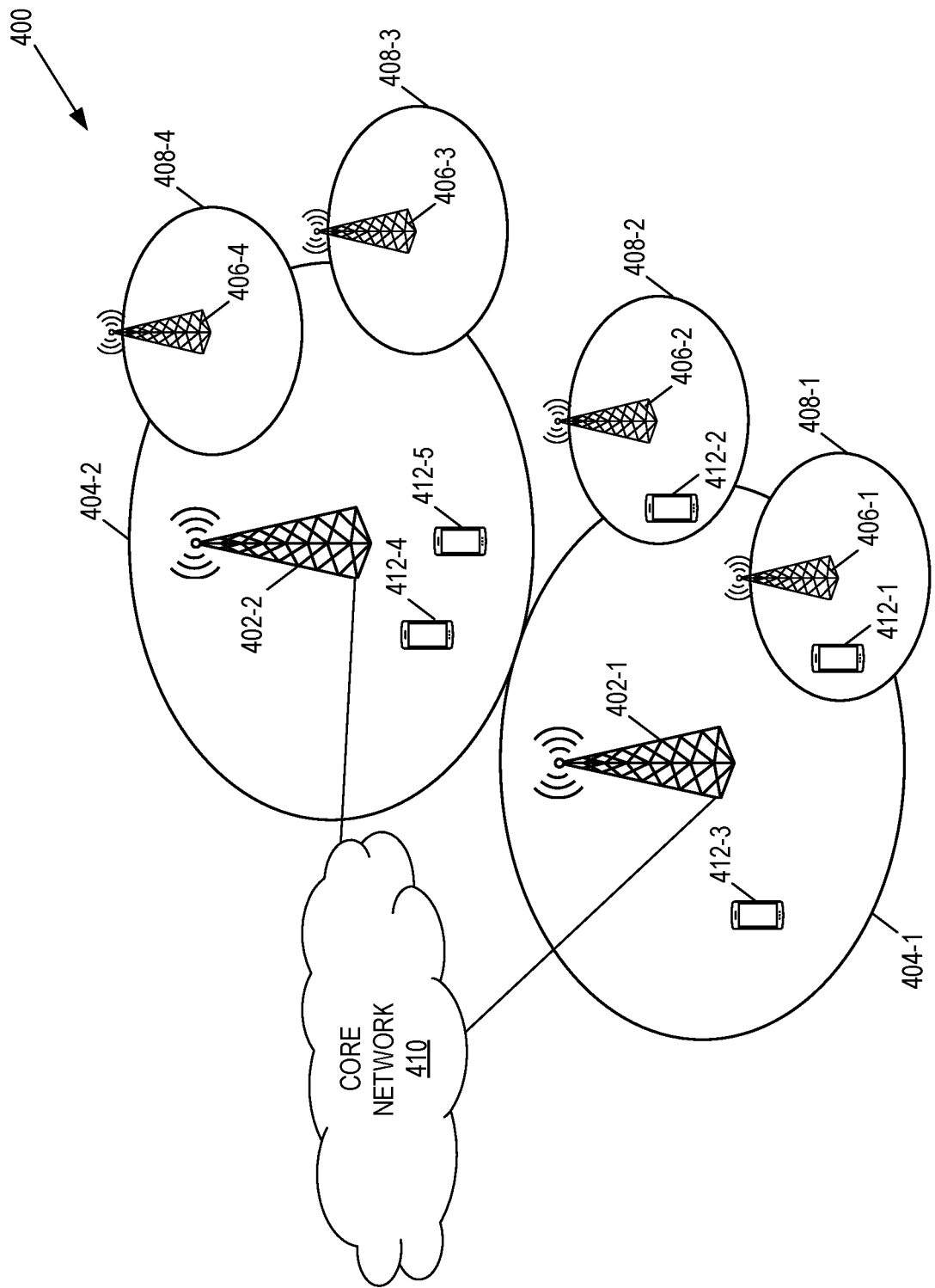
FIG. 4 illustrates one example of a cellular communications network according to some embodiments of the present disclosure.

FIG. 4 illustrates one example of a cellular communications system 400 in which embodiments of the present disclosure may be implemented. In the embodiments described herein, the cellular communications system 400 is a 5G system (5GS) including a NR RAN or LTE RAN (i.e., E-UTRA RAN) or an Evolved Packet System (EPS) including a LTE RAN. In this example, the RAN includes base stations 402-1 and 402-2, which in LTE are referred to as eNBs (when connected to an Evolved Packet Core (EPC)) and in 5G NR are referred to as gNBs (e.g., LTE RAN nodes connected to 5GC, which are referred to as gn-eNBs, controlling corresponding (macro) cells 404-1 and 404-2). The base stations 402-1 and 402-2 are generally referred to herein collectively as base stations 402 and individually as base station 402. Likewise, the (macro) cells 404-1 and 404-2 are generally referred to herein collectively as (macro) cells 404 and individually as (macro) cell 404. The RAN may also include a number of low power nodes 406-1 through 406-4 controlling corresponding small cells 408-1 through 408-4. The low power nodes 406-1 through 406-4 can be small base stations (such as pico or femto base stations) or Remote Radio Heads (RRHs), or the like. Notably, while not illustrated, one or more of the small cells 408-1 through 408-4 may alternatively be provided by the base stations 402. The low power nodes 406-1 through 406-4 are generally referred to herein collectively as low power nodes 406 and individually as low power node 406. Likewise, the small cells 408-1 through 408-4 are generally referred to herein collectively as small cells 408 and individually as small cell 408. The cellular communications system 400 also includes a core network 410, which in the 5GS is referred to as the 5G Core (5GC). The base stations 402 (and optionally the low power nodes 406) are connected to the core network 410.

The base stations 402 and the low power nodes 406 provide service to wireless communication devices 412-1 through 412-5 in the corresponding cells 404 and 408. The wireless communication devices 412-1 through 412-5 are generally referred to herein collectively as wireless communication devices 412 and individually as wireless communication device 412. In the following description, the wireless communication devices 412 are oftentimes UEs, but the present disclosure is not limited thereto.

Figure 5:
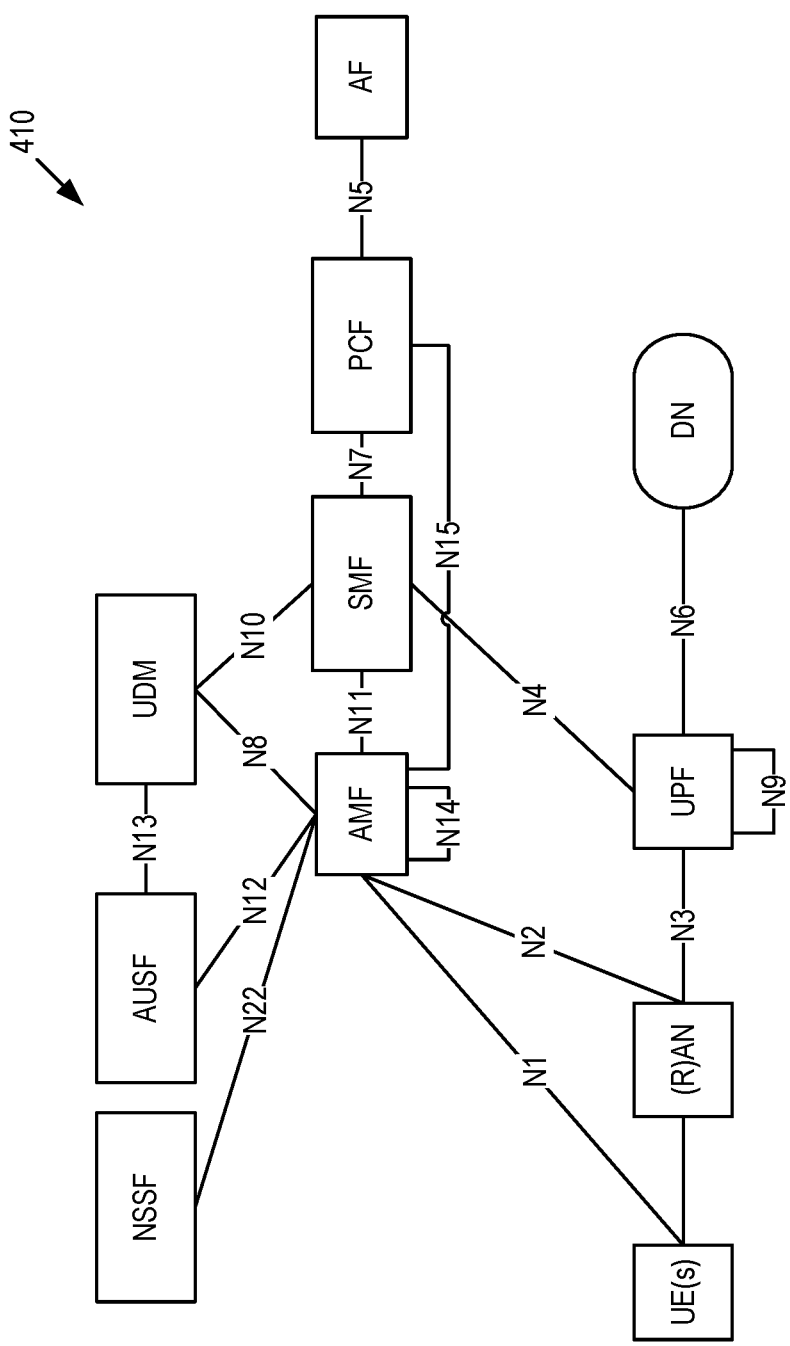
FIG. 5 illustrates a wireless communication system represented as a Fifth Generation (5G) network architecture composed of core Network Functions (NFs), where interaction between any two NFs is represented by a point-to-point reference point/interface.

FIG. 5 illustrates a wireless communication system represented as a 5G network architecture composed of core NFs, where interaction between any two NFs is represented by a point-to-point reference point/interface. FIG. 5 can be viewed as one particular implementation of the system 400 of FIG. 4.

Seen from the access side, the 5G network architecture shown in FIG. 5 comprises a plurality of UEs connected to either a RAN or an Access Network (AN) as well as an Access and Mobility Management Function (AMF). Typically, the (R)AN comprises base stations, e.g. such as eNBs or gNBs or similar. Seen from the core network side, the 5G core NFs shown in FIG. 5 include a NSSF, an AUSF, a UDM, an AMF, a SMF, a PCF, and an Application Function (AF).

Reference point representations of the 5G network architecture are used to develop detailed call flows in the normative standardization. The N1 reference point is defined to carry signaling between the UE and AMF. The reference points for connecting between the AN and AMF and between the AN and UPF are defined as N2 and N3, respectively. There is a reference point, N11, between the AMF and SMF, which implies that the SMF is at least partly controlled by the AMF. N4 is used by the SMF and UPF so that the UPF can be set using the control signal generated by the SMF, and the UPF can report its state to the SMF. N9 is the reference point for the connection between different UPFs, and N14 is the reference point connecting between different AMFs, respectively. N15 and N7 are defined since the PCF applies policy to the AMF and SMF, respectively. N12 is required for the AMF to perform authentication of the UE. N8 and N10 are defined because the subscription data of the UE is required for the AMF and SMF.

The 5G core network aims at separating user plane and control plane. The user plane carries user traffic while the control plane carries signaling in the network. In FIG. 5, the UPF is in the user plane and all other NFs, i.e., the AMF, SMF, PCF, AF, AUSF, and UDM, are in the control plane. Separating the user and control planes guarantees each plane resource to be scaled independently. It also allows UPFs to be deployed separately from control plane functions in a distributed fashion. In this architecture, UPFs may be deployed very close to UEs to shorten the Round Trip Time (RTT) between UEs and data network for some applications requiring low latency.

The core 5G network architecture is composed of modularized functions. For example, the AMF and SMF are independent functions in the control plane. Separated AMF and SMF allow independent evolution and scaling. Other control plane functions like the PCF and AUSF can be separated as shown in FIG. 5. Modularized function design enables the 5G core network to support various services flexibly.

Each NF interacts with another NF directly. It is possible to use intermediate functions to route messages from one NF to another NF. In the control plane, a set of interactions between two NFs is defined as service so that its reuse is possible. This service enables support for modularity. The user plane supports interactions such as forwarding operations between different UPFs.

Figure 6:
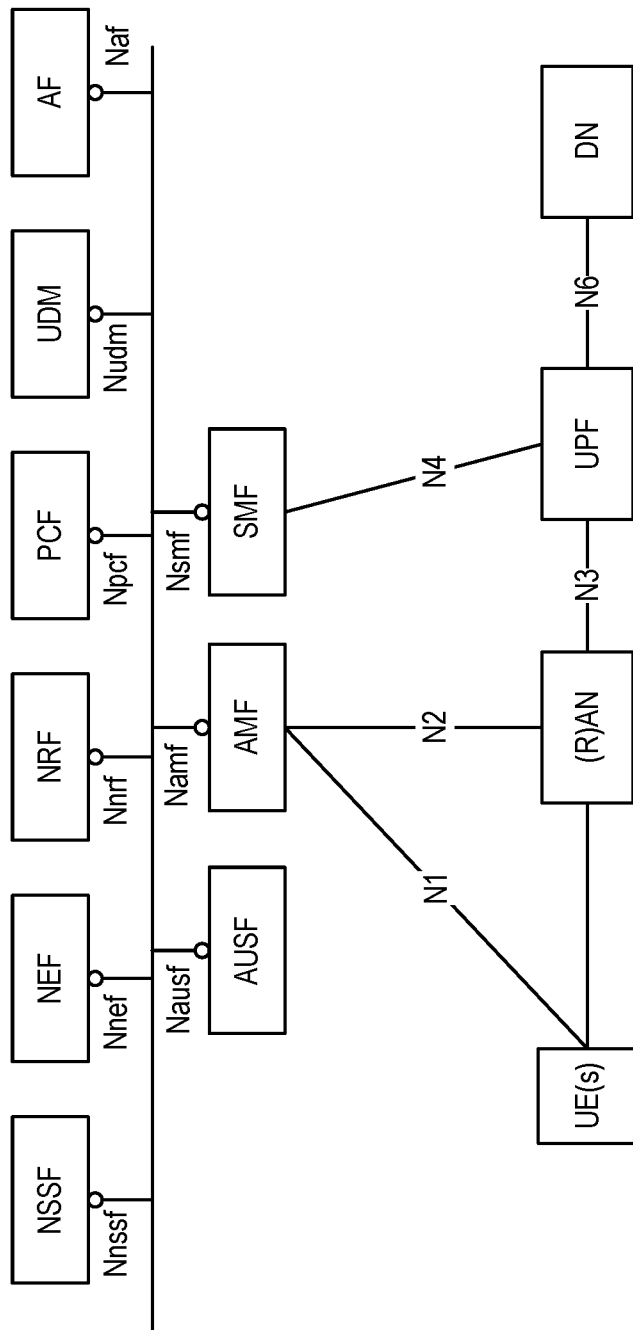
FIG. 6 illustrates a 5G network architecture using service-based interfaces between the NFs in the control plane, instead of the point-to-point reference points/interfaces used in the 5G network architecture of FIG. 5.

FIG. 6 illustrates a 5G network architecture using service-based interfaces between the NFs in the control plane, instead of the point-to-point reference points/interfaces used in the 5G network architecture of FIG. 5. However, the NFs described above with reference to FIG. 5 correspond to the NFs shown in FIG. 6. The service(s) etc. that a NF provides to other authorized NFs can be exposed to the authorized NFs through the service-based interface. In FIG. 6 the service based interfaces are indicated by the letter "N" followed by the name of the NF, e.g. Namf for the service based interface of the AMF and Nsmf for the service based interface of the SMF etc. The NEF and the NRF in FIG. 6 are not shown in FIG. 5 discussed above. However, it should be clarified that all NFs depicted in FIG. 5 can interact with the NEF and the NRF of FIG. 6 as necessary, though not explicitly indicated in FIG. 5.

Some properties of the NFs shown in FIGS. 5 and 6 may be described in the following manner. The AMF provides UE-based authentication, authorization, mobility management, etc. A UE even using multiple access technologies is basically connected to a single AMF because the AMF is independent of the access technologies. The SMF is responsible for session management and allocates IP addresses to UEs. It also selects and controls the UPF for data transfer. If a UE has multiple sessions, different SMFs may be allocated to each session to manage them individually and possibly provide different functionalities per session. The AF provides information on the packet flow to the PCF responsible for policy control in order to support QoS. Based on the information, the PCF determines policies about mobility and session management to make the AMF and SMF operate properly. The AUSF supports authentication function for UEs or similar and thus stores data for authentication of UEs or similar while the UDM stores subscription data of the UE. The Data Network (DN), not part of the 5G core network, provides Internet access or operator services and similar.

An NF may be implemented either as a network element on a dedicated hardware, as a software instance running on a dedicated hardware, or as a virtualized function instantiated on an appropriate platform, e.g., a cloud infrastructure.

Figure 2:
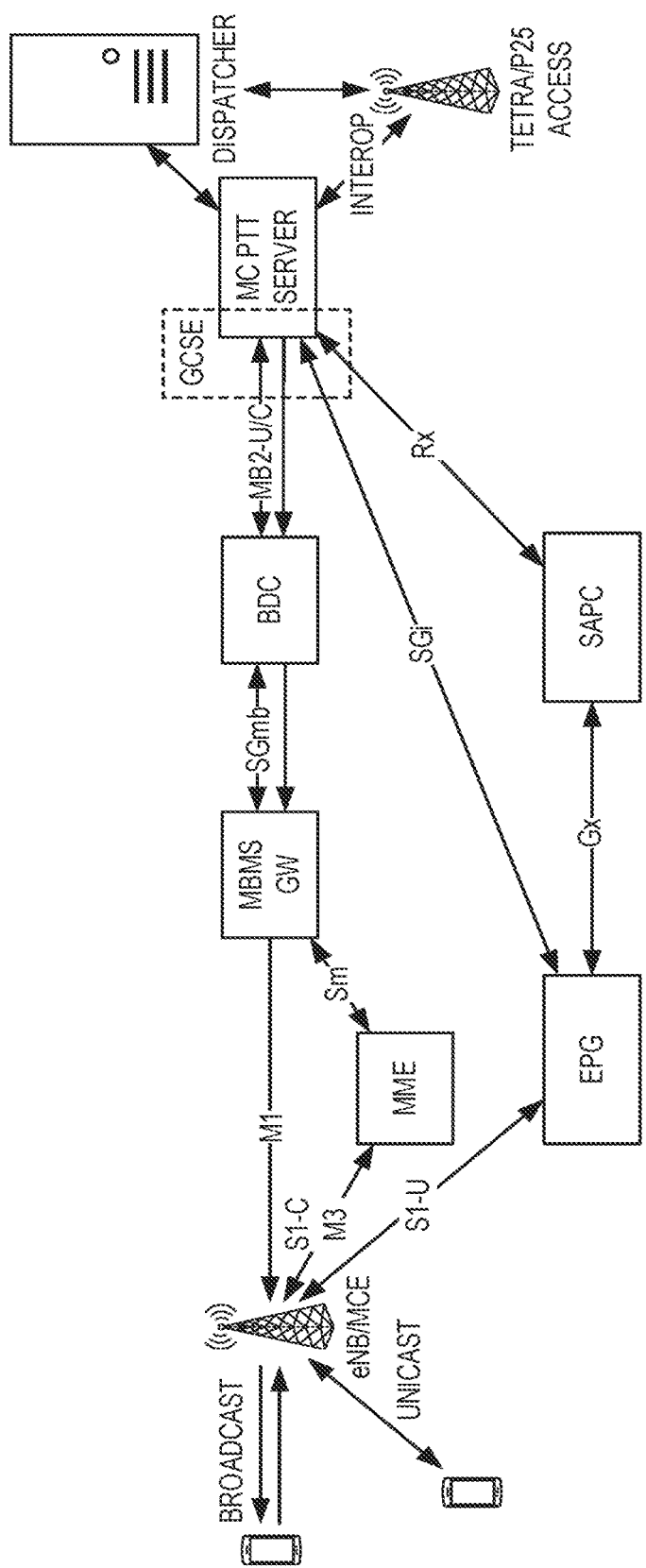
FIG. 2 is a schematic block diagram of a traditional Evolved Packet System (EPS) architecture having a Group Communication System Enabler (GCSE) to deploy eMBMS.
Figure 3:
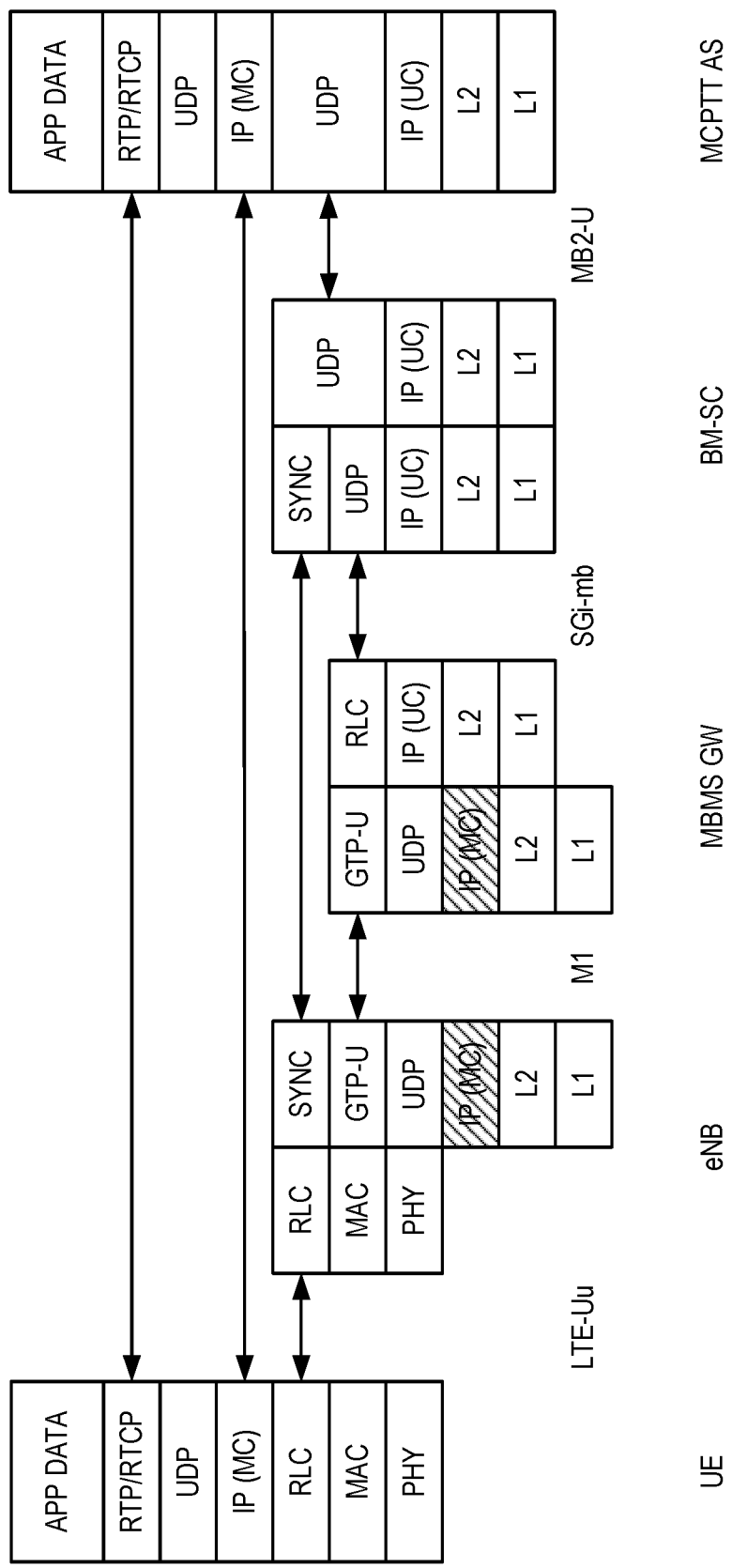
FIG. 3 is a schematic block diagram of LTE eMBMS user plane protocol stacks for Mission-Critical Push-to-Talk (MCPTT) services.

Embodiments of the present disclosure provide a solution for multicast/broadcast group communication with adaptive broadcast areas and session continuity throughout networks, such as the cellular communications system 400 of FIG. 4 (e.g., implemented as a 5G network as in FIGS. 5 and 6). The solution can also work together with legacy (e.g., GCSE dependent) architecture, although when moving between the 5G solution and the legacy solution the service may suffer from the same shortcomings as within the legacy solution (described further above with respect to FIGS. 1-3).

Embodiments address session continuity for multicast services (e.g., IP multicast services) in a mobile communication network, for UEs that change network cell from a cell A to another cell B. The original cell A may be alone or part of a cluster of cells forming a SFN. Similarly, cell B may be alone or be part of another, already existing, SFN. Finally, cell B may alternatively become part of the same SFN as cell A by the UE's change of cell. Whatever is said about cell A and/or B in this text also applies to any other cells that form an SFN cluster together with A, B or both.

A multicast stream may be delivered from the Core Network (e.g., 410) to base stations 402 (e.g., radio access nodes such as gNBs) of the RAN, for example via one of the following mechanisms (Dual IP layer case and Single IP layer case, though other routing mechanisms, including non-IP mechanisms, may be used):

Case 1: Dual IP Multicast layers: Via IP Multicast routing of a lower IP Multicast layer carrying the higher IP Multicast layer. This routing is done between Core Network nodes, between a Core Network Node and a radio access node of the RAN, or between radio access nodes of the RAN. The Higher Layer (HL) IP Multicast stream is extracted from the Lower Layer (LL) IP Multicast layer by one or more of the radio access nodes and transmitted from base stations to UEs over radio (e.g., using NR).

Case 2: Single IP Multicast layer: Via direct IP Multicast routing of the mentioned IP Multicast layer from an Application Server (AS, implementing an AF) or Core Network to the UE, with intermediate nodes acting as routers. This IP Multicast stream is finally transmitted over radio (e.g., NR) from base stations to UEs.

To support session continuity one of the following two approaches may be used:

1) Adjacent cells (e.g. cell B) are prepared in advance, by:
  having already joined the LL IP Multicast session (Case 1), or
  receiving the HL IP Multicast via updated routing tables in the network (Case 2).

2) The original cell (cell A) forwards the received LL IP Multicast packets to a new cell (cell B) until:
  the new cell has joined the LL IP Multicast session (Case 1), or
  the routing tables have been changed for the HL IP Multicast stream (Case 2).

The forwarding may in both cases be implemented as a routing functionality on either the LL IP multicast (Case 1) or on the HL IP multicast (Case 2). The forwarding may alternatively be done in some other way.

These two options are here described in more detail:

Approach (1)—Adjacent Cells are Prepared in Advance

Case 1: Adjacent cells are prepared in advance, by having already joined the LL IP Multicast session before the UE changes cell. Each such cell will have to have received information about the existence of the ongoing LL IP Multicast transmission, and how to join it. This information may be received from a Core Network node or from another RAN node (e.g., the gNB of the original cell). The decision to actually join the LL IP Multicast transmission may either be taken locally by the relevant radio access node (e.g., gNB), by another coordinating RAN node or via a Core Network node.

When a UE moves to a new cell, the new cell is then prepared and the same HL IP Multicast session as in the original cell may then start immediately from the new cell, so that full session continuity can be ensured. At the HL IP Multicast layer the UE then receives the same flow of IP packets as if the UE had stayed in the original cell. When the UE has left cell A, cell A can stop the HL IP Multicast transmission if this UE was the only one receiving the HL IP Multicast in that cell. Otherwise it will continue the HL IP Multicast transmission in cell A.

The radio transmission from each of cell A and cell B may be in either Point-To-Multipoint (PTM) or Point-To-Point (PTP) mode with any combination between these, i.e. any of (cell A/cell B) PTM/PTM, PTM/PTP, PTP/PTM, PTP/PTP may be used. As mentioned above, cell A and/or B may also be part of an SFN with other adjacent cells, in which case the use of PTP or PTM applies equally to all cells of the same SFN in line with normal SFN operation. Cells A and B may also be part of the same SFN, in which case the SFN contribution from cell B starts when the RAN decides to include the cell in the SFN transmission and/or with the UE joining cell B (assuming no other UE in cell B was already receiving the IP Multicast). Such transmission may be called Multipoint-to-Multipoint (MTM) or Multi-Cell Point-to-Multipoint (MC-PTM).

Case 2: Adjacent cells are prepared in advance, by already receiving the IP Multicast session, thanks to updated routing tables, before the UE changes cell. The decision to update the routing tables in this way may either be taken locally by the relevant radio access node (e.g., gNB), by another coordinating RAN node or via a Core Network node.

When a UE moves to a new cell the new cell is then prepared and the same IP Multicast session as in the original cell may then start immediately from the new cell, so that full session continuity can be ensured. At the IP Multicast layer the UE then receives the same flow of IP packets as if the UE had stayed in the original cell. When the UE has left cell A, cell A can stop the IP Multicast transmission if this UE was the only one receiving the IP Multicast in that cell. Otherwise it will continue the IP Multicast transmission in cell A.

The radio transmission from each of cell A and cell B may be in either PTM or PTP mode with any combination between these, i.e. any of (cell A/cell B) PTM/PTM, PTM/PTP, PTP/PTM, PTP/PTP may be used. As mentioned above, cell A and/or B may also be part of an SFN with other adjacent cells, in which case the use of PTP or PTM applies equally to all cells of the same SFN in line with normal SFN operation. Cells A and B may also be part of the same SFN, in which case the SFN contribution from cell B starts when the RAN decides to include the cell in the SFN transmission and/or with the UE joining cell B (assuming no other UE in cell B was already receiving the IP Multicast).

Approach (2)—The Original Cell (Cell A) Forwards the Received IP Multicast Packets to New Cell Case 1: The original cell (cell A) forwards the received LL IP Multicast packets to a new cell (cell B) until the new cell has joined the LL IP Multicast session and received the LL IP Multicast stream from the Core Network. The LL IP Multicast is therefore first received by the radio access node (e.g., gNB) of cell A, which transmits the HL IP Multicast stream to one or more UEs, but at the same time also forwards the LL IP Multicast stream to cell B. The UE may then change cell from A to B and immediately receive the same HL IP Multicast session from cell B. In parallel with transmitting the forwarded/routed LL IP Multicast stream the radio access node (e.g., gNB) of cell B also joins the LL IP Multicast session, so that it can receive the LL IP Multicast stream directly from the Core Network, without going via the cell A.

When cell B has joined the LL IP Multicast session and is receiving the LL IP Multicast stream, it informs cell A that it can stop the forwarding, after which only cell B transmits the HL IP Multicast using packets directly received from the Core Network.

Case 2: The original cell (cell A) forwards the received IP Multicast packets to a new cell (cell B) until the new cell has received the IP Multicast stream thanks to updated routing tables. The IP Multicast is therefore first received by the radio access node (e.g., gNB) of cell A, which transmits the IP Multicast stream over radio, but at the same time also forwards/routes the IP Multicast stream to cell B. The UE may then change cell from A to B and immediately receive the same IP Multicast session from cell B. In parallel with transmitting the forwarded/routed IP Multicast stream, the radio access node (e.g., gNB) of cell B also starts to receive the IP Multicast stream directly from the Core Network, without going via the cell A.

When cell B is receiving the IP Multicast stream, it informs cell A that it can stop the forwarding, after which only cell B transmits the IP Multicast using packets directly received from the Core Network.

Compared to the legacy solution where Service Area Identifier(s) (SAIs) were used to identify a static area, in the proposed solution the SAI(s) may instead only be used to identify the initial area where the broadcast service (with a Temporary Mobile Group Identity (TMGI)) is started by the AS providing a group communication service, based on reported UE locations. Where an SAI consists of a number of base stations known by the MME in LTE eMBMS (Enhanced Multimedia Broadcast/Multicast Service) architecture, this would analogously be known by the AMF in a 5G Broadcast architecture; each cell is also sending this SAI (or a set of SAIs) as a System Information Broadcast.

Other solutions in place of an SAI may be used according to embodiments of the present disclosure, such as:
  A list of cells could be used instead of SAI to identify the area where the broadcast service is started.
  A list of UEs could be used, based on an assumption that the UE locations have been signaled to both radio access nodes (e.g., gNBs) and AMF.
  A service identifier, such as the TMGI or the HL (or single layer) IP Multicast address, could be used. This is based on the assumption that the UE locations have been signaled to both radio access nodes (e.g., gNBs) and AMF, together with the assumption that the radio access nodes (e.g., gNBs) and AMF have also been signaled the service identifiers for each UE.

Both in the legacy solution and in the proposed solution, the participating radio base stations receive the user plane traffic of the service (identified by, e.g., the TMGI) via a LL (see FIG. 3, marked with a pattern) IP Multicast from the Broadcast Core. In examples of the 5GC, the Broadcast Core may be further split into a Multicast Service or Session Management Function (M-SMF) in the control plane and a Multicast User Plane Function (M-UPF) in the user plane.

Figure 7:
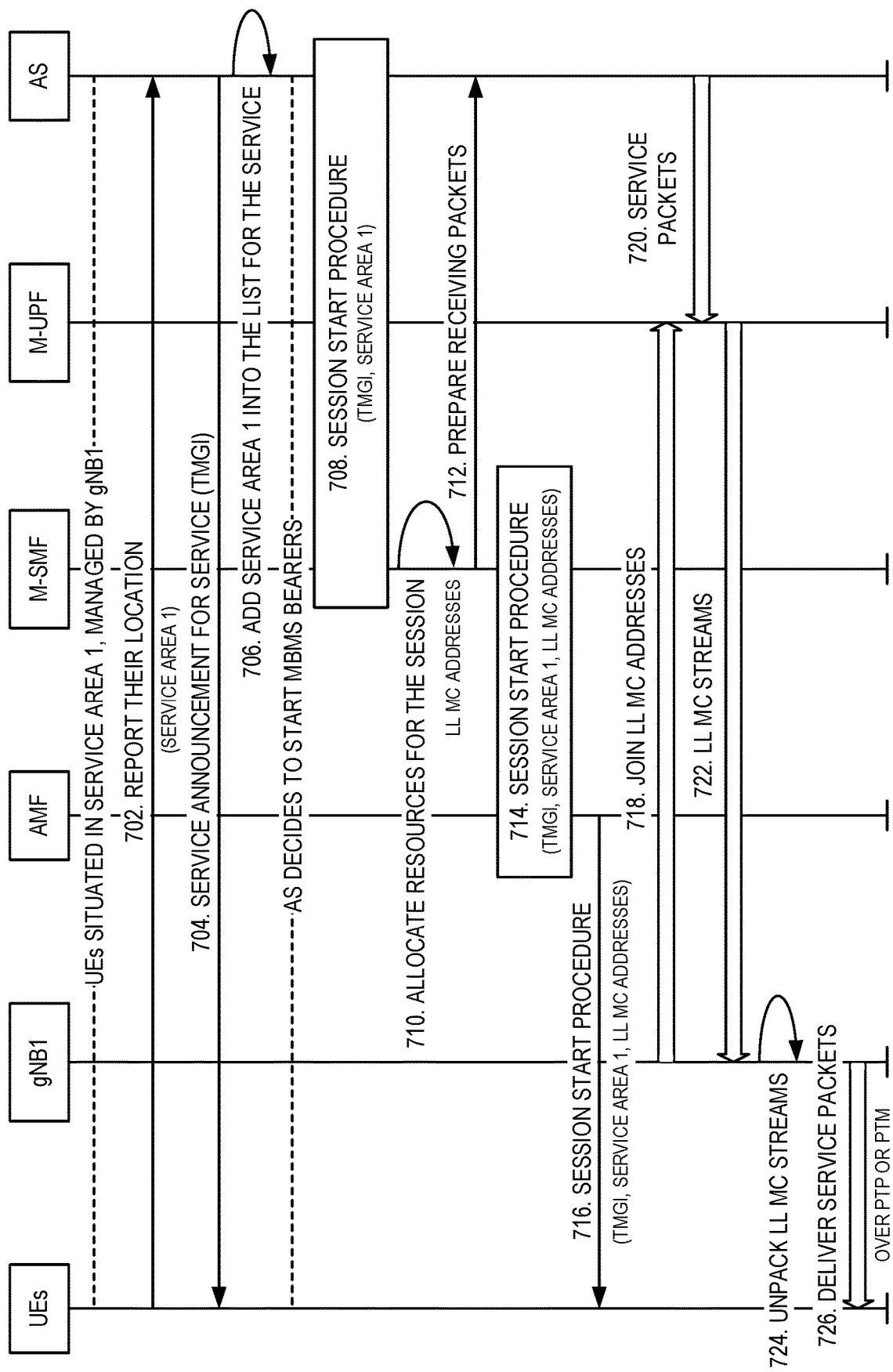
FIG. 7 is a flow diagram illustrating an exemplary initial setup of a multicast transmission session.

FIG. 7 is a flow diagram illustrating an exemplary initial setup of a multicast transmission session. In an exemplary aspect, one or more UEs are situated in a first service area (e.g., service area 1) and managed by a first radio access node (e.g., gNB1). At step 702, the UEs report their locations (e.g., service area 1) to an AS. At step 704, the AS performs a service announcement about a coming broadcast service, including a TMGI as the multicast service identity. At step 706, the AS further includes service area 1 into the service area list for the multicast service.

At a later point, the AS decides to start the MBMS bearer for the multicast service. At step 708, the AS performs a session start procedure for a multicast transmission session of the multicast service towards M-SMF under service area 1, providing the TMGI of the multicast service. At step 710, the M-SMF allocates the resources for the session. In the broadcast core network, the LL multicast (MC) address needs to be assigned (Case 1). At step 712, the M-SMF further notifies the M-UPF to be prepared for receiving the packets from the AS.

At step 714, the M-SMF performs a session start procedure for the multicast transmission session towards the AMF, providing the TMGI, service area 1, and the LL MC (e.g., IP) address. At step 716, the AMF performs a session start procedure for the multicast transmission session towards the RAN (e.g., including the first radio access node, gNB1, in the illustrated example), providing the TMGI, service area 1, and the LL MC (e.g., IP) address.

At step 718, the first radio access node (e.g., gNB1) and other RAN nodes in the multicast service join the multicast transmission session using the LL MC address to receive the multicast stream (e.g., multicast packets). At step 720, the AS sends packets for the multicast service towards the M-UPF. At step 722, the M-UPF multicasts the packets out using the LL MC (e.g., IP) address. At step 724, the first radio access node (e.g., gNB1) receives and unpacks packets of the multicast stream. At step 726, the first radio access node (e.g., gNB1) delivers the packets over the air (e.g., via PTP or PTM) using the TMGI.

In the proposed solution the radio access nodes joining the LL (IP) Multicast are not statically defined by an SAI or list of SAIs when establishing the bearer. Instead, the radio access nodes are dynamically adapted based on the UEs interested in the service (e.g., identified by the TMGI). The Group Communication Service (GCS) client therefore still may report its SAI (and/or cell) location to the GCS AS (e.g., for session start purposes), but it also reports to the RAN (e.g., reporting to or via the serving cell) its interest in the service (e.g., using the TMGI or G-RNTI identifier).

In LTE eMBMS there is no concept of network support for mobility or handover of the broadcast bearer. In the proposed (e.g., 5G) solution the RAN needs to ensure that a UE moving from one cell (or often cluster of cells supporting the UE—a dynamic type of SFN transmission or MC-PTM, as compared with a Single-Cell Point-to-Multipoint (SC-PTM)) to another cell, previously not serving the user and not part of the current transmission of the broadcast service (e.g., multicast transmission session)—is seamlessly served by the new cell. In this manner, the proposed solution provides session continuity. Preferably, the first cell (i.e. the one cell) is adjacent to or neighboring the second cell (i.e. the other cell). Preferably, the first cell is served by a first radio access node and the second cell is served by a neighboring second radio access node.

Figure 8:
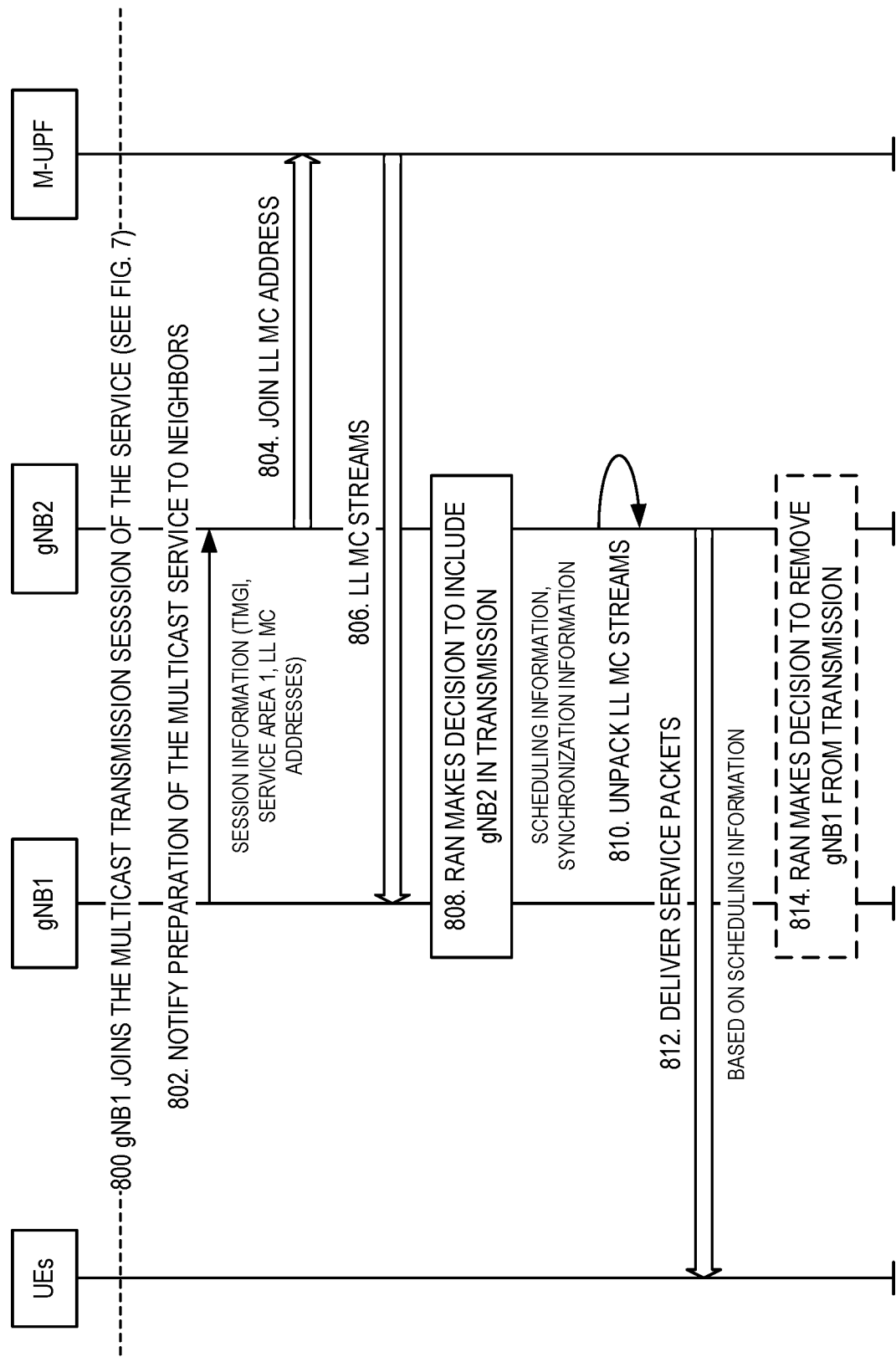
FIG. 8 is a flow diagram illustrating providing adaptive service areas for a multicast transmission session according to a first approach.
Figure 9:
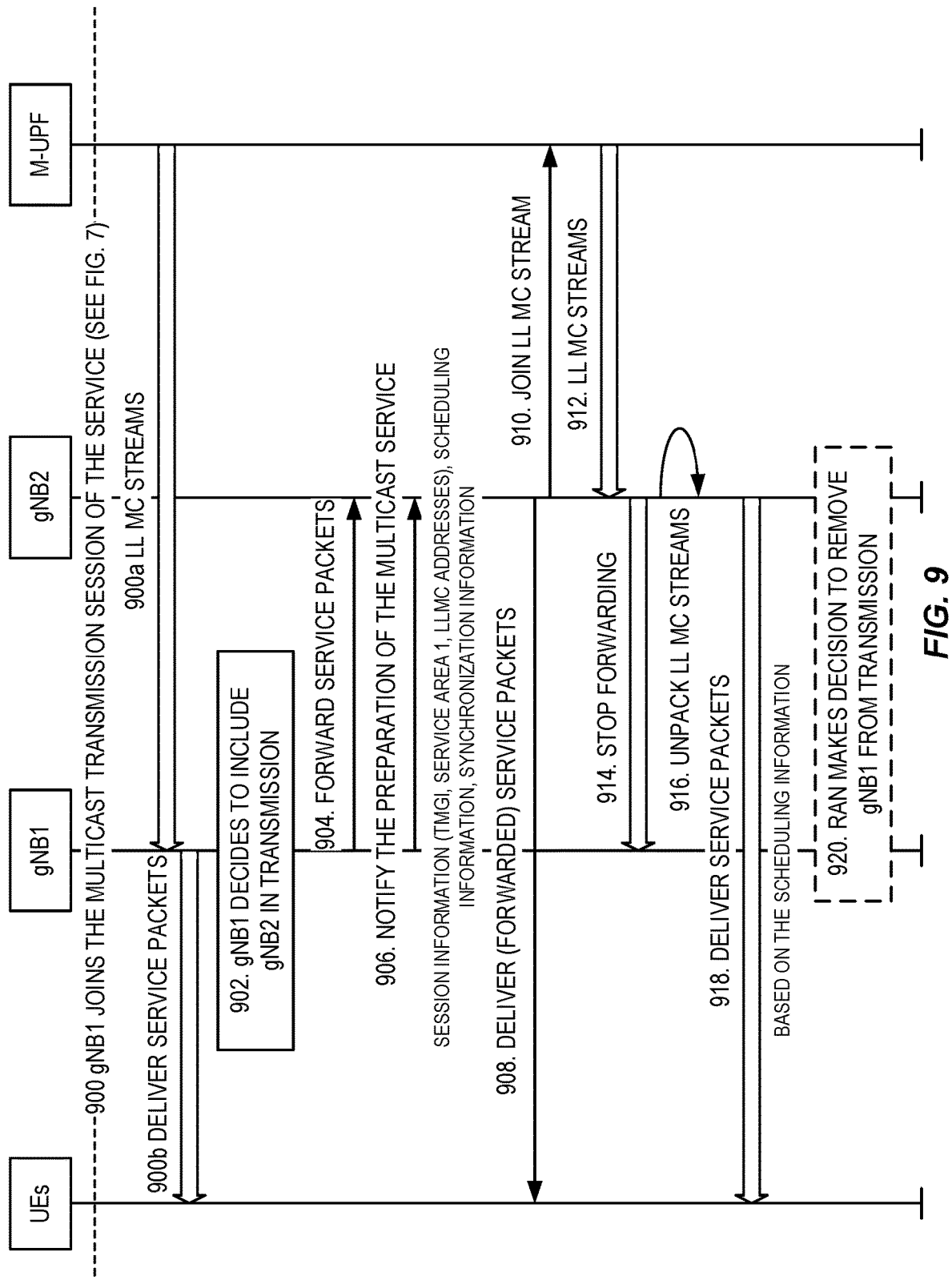
FIG. 9 is a flow diagram illustrating providing adaptive service areas for a multicast transmission session according to a second approach.

FIGS. 8 and 9 describe the interaction between Core and RAN according to aspects disclosed herein in greater detail, as well as addressing other aspects and embodiments. These Figures are described below with reference to Case 1 (e.g., Dual IP Multicast Layers), but a similar solution can also be applied for Case 2 (e.g., Single IP Multicast Layer). In addition, the below text is focused on a dynamic SFN scenario, where cells dynamically are added or removed to an SFN transmission based on UE locations and radio conditions.

FIG. 8 is a flow diagram illustrating providing adaptive service areas for a multicast transmission session according to a first approach (e.g., Approach (1) described above). Note that optional steps are indicated by dashed lines/boxes. Under Approach (1), each cell that is currently actively transmitting the broadcast service signals to all its neighbor cells that they need to be prepared to transmit the service (e.g., identified by a TMGI and delivered from the Broadcast Core via a LL (e.g., IP) MC service). This can be signaled using, for example, the Xn interface to the radio access node (e.g., gNB) serving the cell.

It should be understood that "all its neighbor cells" could, in some embodiments, be an intelligently derived subset of the neighbors. Neighbor cells may be identified by Automatic Neighbor Relation (ANR) procedures or relations created through other means, such as manual configurations. For example, neighboring radio access nodes may be identified by the RAN based on one or more of cell location, UE location, or a determined handover probability during the multicast transmission session. Thus, neighboring radio access nodes can be those most likely to serve UEs receiving the multicast service.

Signaled radio access nodes (e.g., gNBs) join the multicast transmission session (e.g., using an LL MC address provided by an M-SMF or other entity) to receive the user plane traffic. If the neighbor cell is already served by the same gNB it already has the user plane (possibly via internal CU/DU communication via, e.g., the F1 interface). When the RAN makes a decision (e.g., based on radio conditions or UE movement) to add a neighbor cell to the transmission to better serve participating UEs, the user plane is already made available for session continuity and seamless "handover" of the transmission of the service.

With further reference to FIG. 8, at step 800, a first radio access node (e.g., gNB1) in the RAN joins the multicast transmission session of the service, such as described above with respect to FIG. 7. When a RAN decision is made to include gNB1 cells in the transmission of the service (possibly together with a cluster of other cells), it also takes pro-active measures to prepare for mobility to its neighbors. At step 802, the first radio access node (gNB1) notifies its neighbors, including a second radio access node (e.g., gNB2), to prepare for the multicast service. The first radio access node (gNB1) provides a preparation notification to the second radio access node (gNB2) which includes session information (e.g., the TMGI, LL (e.g., IP) MC address). At step 804, the second radio access node (gNB2) joins the multicast transmission session using the session information (e.g., by joining the LL IP multicast group) to receive the service packets.

At step 806, the M-UPF delivers the multicast stream towards the second radio access node (gNB2) in addition to the first radio access node (gNB1) (as well as other gNBs in some examples). At step 808, the RAN makes a decision (e.g., based on a UE entering another cell or radio conditions, such as signal strength of a UE) to include gNB2 cell(s) (or beams) in the radio transmission of the service. Required scheduling and/or synchronization information is shared with the second radio access node (gNB2) (e.g., by the first radio access node or another node in the RAN).

At step 810, the second radio access node (gNB2) starts processing/unpacking the most recent packets it has received from the M-UPF for the multicast service (e.g., prior to this packets of the multicast stream are received without being processed or transmitted by gNB2). At step 812, gNB2 cell(s) (or beams) deliver the packets for the multicast service based on the scheduling information or synchronization information received from the RAN (e.g., from gNB1). At step 814, the RAN may optionally decide to remove the first radio access node (gNB1) from the transmission (e.g., because no UE to receive the multicast stream is served by gNB1). As a consequence, the first radio access node (gNB1) may cease transmission of the multicast stream, though it may be prepared to resume transmission.

FIG. 9 is a flow diagram illustrating providing adaptive service areas for a multicast transmission session according to a second approach (e.g., Approach (2) described above). Note that optional steps are indicated by dashed lines/boxes. Under Approach (2), when the RAN makes a decision (e.g., based on radio conditions or movement of a UE) to add a neighbor cell to the transmission to better serve participating UEs, the user plane traffic is initially forwarded to the neighbor radio access node. For example, packets may be forwarded to a neighboring Central Unit (CU) of the RAN using the Xn interface. Another option is to use an inter Distributed Unit (DU) LL interface, such as the Ericsson E5 interface for Elastic RAN. This packet forwarding has to be delivered within the time budget required in order for the new cell to synchronously transmit the service with other participating cells. On reception of the packet forwarding the new radio access node initiates joining the multicast transmission session directly. Upon receiving the multicast stream, the new radio access node should signal back to the forwarding radio access node to cease forwarding.

At step 900, a first radio access node (e.g., gNB1) in the RAN joins the multicast transmission session of the service, such as described above with respect to FIG. 7. At Steps 900a and 900b, the first radio access node (gNB1) (and possibly other gNBs) receives the multicast stream of a service and broadcasts the stream.

At step 902, a RAN decision (e.g., based on the radio conditions of the receiving UEs) is made to include a second radio access node (gNB2) in the transmission. In an exemplary aspect, the first radio access node (gNB1) decides to include the second radio access node (gNB2) in the transmission. At step 904, the first radio access node (gNB1) (or the node handling cell A) forwards the packets in the user plane to the second radio access node (gNB2) (or the node handling cell B), together with required scheduling and/or synchronization information. At step 906, gNB1 (or the node handling cell A) also notifies the required information for gNB2 (or the node handling cell B) to retrieve the multicast service from the M-UPF. That is, the first radio access node provides a preparation notification to the second radio access node which includes session information (such as TMGI, LL (e.g., IP) MC address) for the multicast transmission session.

At step 908, the second radio access node (gNB2) delivers the forwarded packets received from the first radio access node (gNB1). In parallel, at step 910, the second radio access node (gNB2) also joins the multicast transmission session using the session information (e.g., by joining the IP Multicast service provided by the M-UPF). At step 912, the M-UPF delivers the multicast stream towards the second radio access node (gNB2). At step 914, upon receiving the multicast stream from the M-UPF, the second radio access node (gNB2) requests to cancel packet forwarding from the first radio access node (gNB1) (e.g., by providing a stop notification).

At step 916, the second radio access node (gNB2) receives the packets of the multicast stream and unpacks them. At step 918, the second radio access node (gNB2) delivers the packets for the multicast service based on the scheduling and/or synchronization information it has received from the first radio access node (gNB1). At step 920, the RAN may optionally decide to remove the first radio access node (gNB1) from the transmission (e.g., because no UE to receive the multicast stream is served by gNB1). As a consequence, the first radio access node (gNB1) may cease transmission of the multicast stream.

In the above text describing FIGS. 7-9, when using the term gNB this could imply different types of radio base stations, not limited to NR radio bases stations. It could also imply a gNB architecture where some functionality is executed in a gNB CU and other functionality in gNB DUs. In some cases gNB1 and gNB2 could be the same gNB, but instead indicate different DUs.

The legacy GCSE architecture can still be optionally used to select between unicast and broadcast transmissions and to select which broadcast area to transmit to. However, if all users are served via the above described (e.g., 5G) broadcast service and there is no need to support legacy eMBMS and no need to transfer users between unicast and broadcast service, the GCSE function to select delivery path is no longer needed.

Figure 10:
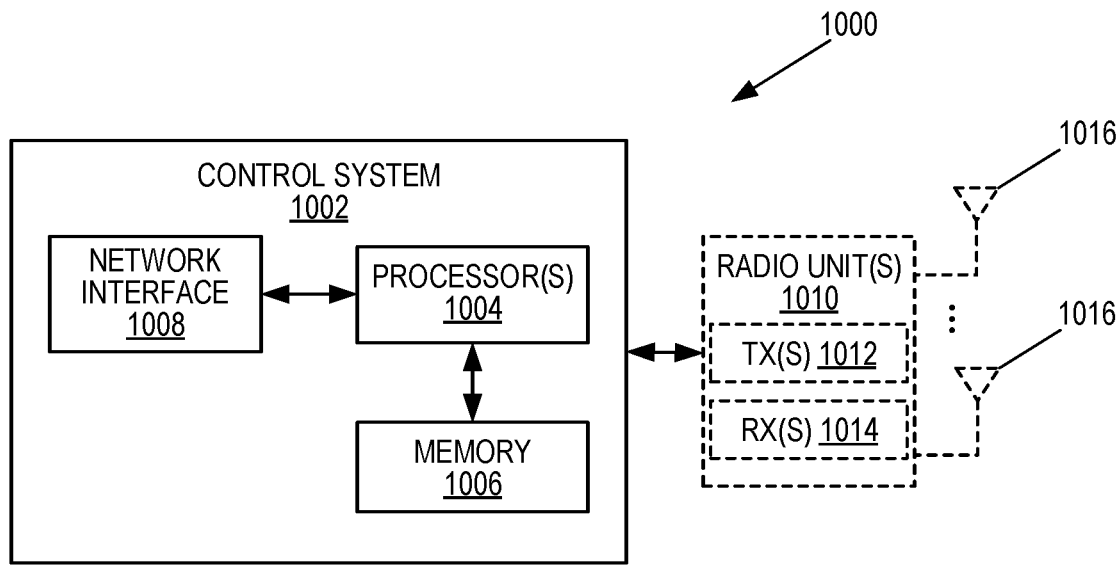
FIG. 10 is a schematic block diagram of a radio access node according to some embodiments of the present disclosure.

FIG. 10 is a schematic block diagram of a radio access node 1000 according to some embodiments of the present disclosure. Optional features are represented by dashed boxes. The radio access node 1000 may be, for example, a base station 402 or 406 or a network node that implements all or part of the functionality of the base station 402 or gNB described herein. As illustrated, the radio access node 1000 includes a control system 1002 that includes one or more processors 1004 (e.g., Central Processing Units (CPUs), Application Specific Integrated Circuits (ASICs), Field Programmable Gate Arrays (FPGAs), and/or the like), memory 1006, and a network interface 1008. The one or more processors 1004 are also referred to herein as processing circuitry. In addition, the radio access node 1000 may include one or more radio units 1010 that each includes one or more transmitters 1012 and one or more receivers 1014 coupled to one or more antennas 1016. The radio units 1010 may be referred to or be part of radio interface circuitry. In some embodiments, the radio unit(s) 1010 is external to the control system 1002 and connected to the control system 1002 via, e.g., a wired connection (e.g., an optical cable). However, in some other embodiments, the radio unit(s) 1010 and potentially the antenna(s) 1016 are integrated together with the control system 1002. The one or more processors 1004 operate to provide one or more functions of a radio access node 1000 as described herein. In some embodiments, the function(s) are implemented in software that is stored, e.g., in the memory 1006 and executed by the one or more processors 1004.

Figure 11:
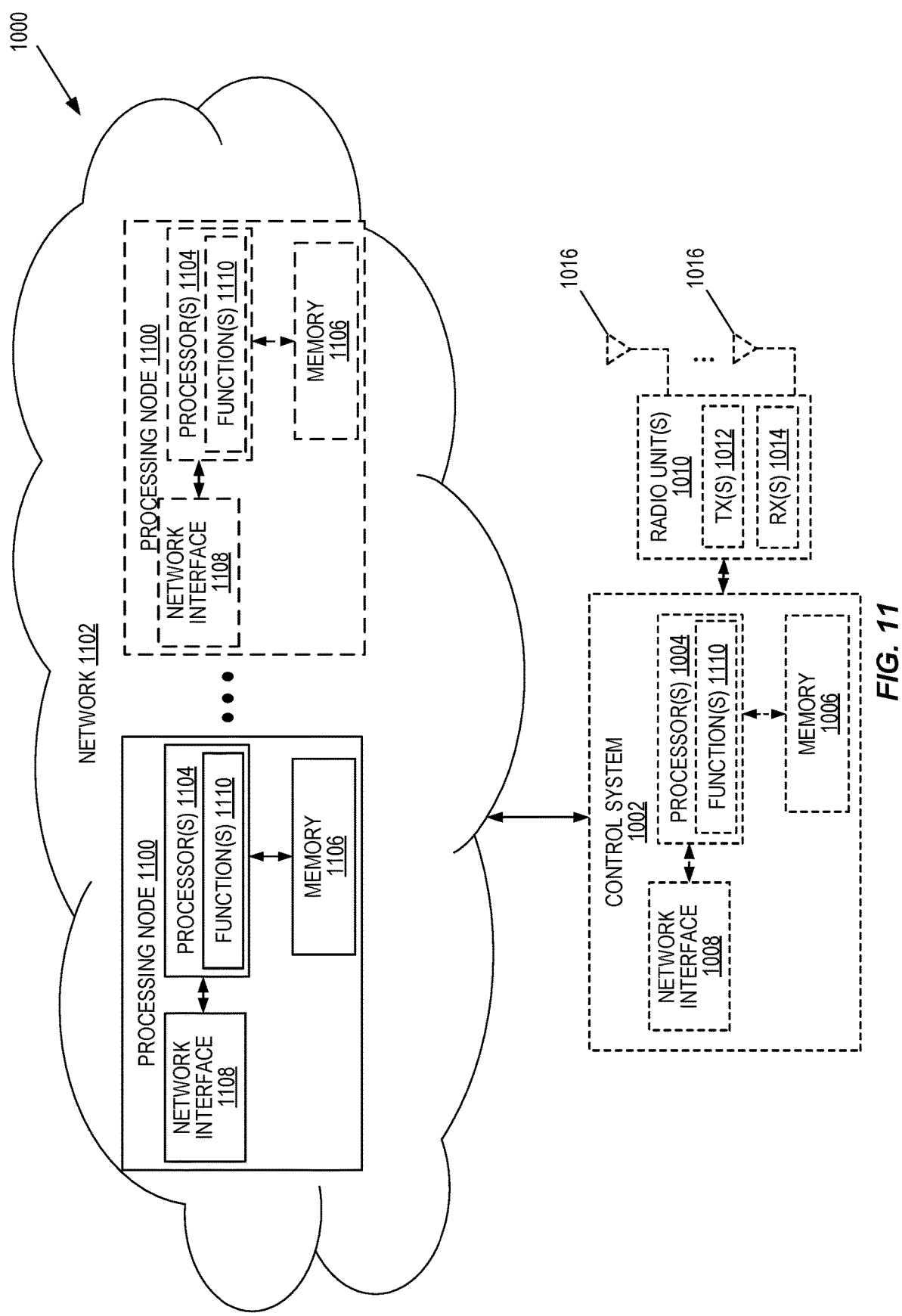
FIG. 11 is a schematic block diagram that illustrates a virtualized embodiment of the radio access node of FIG. 10 according to some embodiments of the present disclosure.

FIG. 11 is a schematic block diagram that illustrates a virtualized embodiment of the radio access node 1000 according to some embodiments of the present disclosure. This discussion is equally applicable to other types of network nodes. Further, other types of network nodes may have similar virtualized architectures. Again, optional features are represented by dashed boxes.

As used herein, a "virtualized" radio access node is an implementation of the radio access node 1000 in which at least a portion of the functionality of the radio access node 1000 is implemented as a virtual component(s) (e.g., via a virtual machine(s) executing on a physical processing node(s) in a network(s)). As illustrated, in this example, the radio access node 1000 may include the control system 1002 and/or the one or more radio units 1010, as described above. The control system 1002 may be connected to the radio unit(s) 1010 via, for example, an optical cable or the like. The radio access node 1000 includes one or more processing nodes 1100 coupled to or included as part of a network(s) 1102. If present, the control system 1002 or the radio unit(s) are connected to the processing node(s) 1100 via the network 1102. Each processing node 1100 includes one or more processors 1104 (e.g., CPUs, ASICs, FPGAs, and/or the like), memory 1106, and a network interface 1108.

In this example, functions 1110 of the radio access node 1000 described herein are implemented at the one or more processing nodes 1100 or distributed across the one or more processing nodes 1100 and the control system 1002 and/or the radio unit(s) 1010 in any desired manner. In some particular embodiments, some or all of the functions 1110 of the radio access node 1000 described herein are implemented as virtual components executed by one or more virtual machines implemented in a virtual environment(s) hosted by the processing node(s) 1100. As will be appreciated by one of ordinary skill in the art, additional signaling or communication between the processing node(s) 1100 and the control system 1002 is used in order to carry out at least some of the desired functions 1110. Notably, in some embodiments, the control system 1002 may not be included, in which case the radio unit(s) 1010 communicate directly with the processing node(s) 1100 via an appropriate network interface(s).

In some embodiments, a computer program including instructions which, when executed by at least one processor, causes the at least one processor to carry out the functionality of radio access node 1000 or a node (e.g., a processing node 1100) implementing one or more of the functions 1110 of the radio access node 1000 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 12:
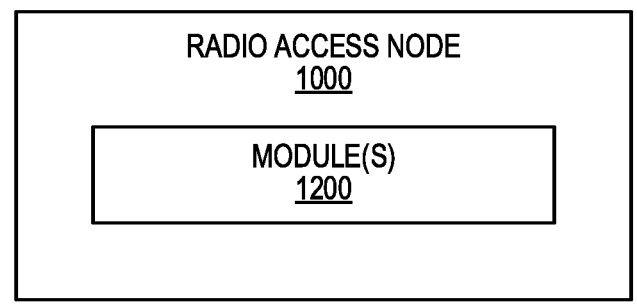
FIG. 12 is a schematic block diagram of the radio access node of FIG. 10 according to some other embodiments of the present disclosure.

FIG. 12 is a schematic block diagram of the radio access node 1000 according to some other embodiments of the present disclosure. The radio access node 1000 includes one or more modules 1200, each of which is implemented in software. The module(s) 1200 provide the functionality of the radio access node 1000 described herein. This discussion is equally applicable to the processing node 1100 of FIG. 11 where the modules 1200 may be implemented at one of the processing nodes 1100 or distributed across multiple processing nodes 1100 and/or distributed across the processing node(s) 1100 and the control system 1002.

Figure 13:
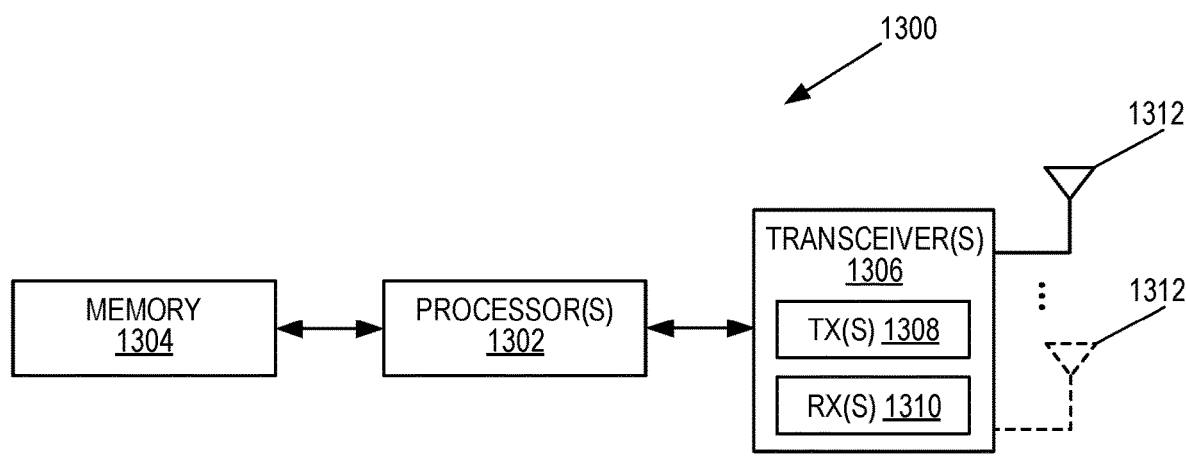
FIG. 13 is a schematic block diagram of a wireless communication device according to some embodiments of the present disclosure.

FIG. 13 is a schematic block diagram of a wireless communication device 1300 according to some embodiments of the present disclosure. As illustrated, the wireless communication device 1300 includes one or more processors 1302 (e.g., CPUs, ASICs, FPGAs, and/or the like), memory 1304, and one or more transceivers 1306 each including one or more transmitters 1308 and one or more receivers 1310 coupled to one or more antennas 1312. The transceiver(s) 1306 includes radio-front end circuitry connected to the antenna(s) 1312 that is configured to condition signals communicated between the antenna(s) 1312 and the processor(s) 1302, as will be appreciated by on of ordinary skill in the art. The processors 1302 are also referred to herein as processing circuitry. The transceivers 1306 are also referred to herein as radio circuitry. In some embodiments, the functionality of the wireless communication device 1300 described above may be fully or partially implemented in software that is, e.g., stored in the memory 1304 and executed by the processor(s) 1302. Note that the wireless communication device 1300 may include additional components not illustrated in FIG. 13 such as, e.g., one or more user interface components (e.g., an input/output interface including a display, buttons, a touch screen, a microphone, a speaker(s), and/or the like and/or any other components for allowing input of information into the wireless communication device 1300 and/or allowing output of information from the wireless communication device 1300), a power supply (e.g., a battery and associated power circuitry), etc.

In some embodiments, a computer program including instructions which, when executed by at least one processor, causes the at least one processor to carry out the functionality of the wireless communication device 1300 according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 14:
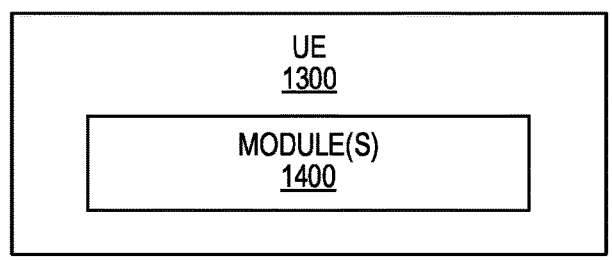
FIG. 14 is another schematic block diagram of a wireless communication device according to some embodiments of the present disclosure.

FIG. 14 is a schematic block diagram of the wireless communication device 1300 according to some other embodiments of the present disclosure. The wireless communication device 1300 includes one or more modules 1400, each of which is implemented in software. The module(s) 1400 provide the functionality of the wireless communication device 1300 described herein.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include DSPs, special-purpose digital logic, and the like. The processing circuitry may be configured to execute program code stored in memory, which may include one or several types of memory such as ROM, RAM, cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

Some embodiments described above may be summarized in the following manner:

1. A method performed by a first radio access node (e.g., gNB1) in a Radio Access Network, RAN, for providing adaptive service areas in a multicast transmission session, the method comprising:
   participating (800) in a multicast transmission session, comprising a multicast stream transmitted at least by the first radio access node to one or more User Equipment, UE, in a first cell; and
   providing (802) a preparation notification to a second radio access node (e.g., gNB2) neighboring the first radio access node, the preparation notification comprising session information for the multicast transmission session.

2. The method of embodiment 1, further comprising joining (800) the multicast transmission session;
   wherein the preparation notification is provided (802) to the second radio access node in response to joining (800) the multicast transmission session.

3. The method of any of embodiments 1 to 2, wherein the session information comprises at least one of a Temporary Mobile Group Identity, TMGI, or an address for the multicast stream.

4. The method of any of embodiments 1 to 3, further comprising deciding (808) to include the second radio access node in the multicast transmission session.

5. The method of embodiment 4, wherein deciding (808) to include the second radio access node in the multicast transmission session is based on a radio condition in the RAN comprising the first radio access node and the second radio access node.

6. The method of embodiment 5, wherein the radio condition comprises a signal strength for a UE having a Temporary Mobile Group Identity, TMGI, associated with the multicast transmission session.

7. The method of any of embodiments 4 to 6, wherein deciding (808) to include the second radio access node in the multicast transmission session comprises determining that a UE receiving the multicast stream has entered or is about to enter a second cell of the second radio access node.

8. The method of any of embodiments 1 to 7, further comprising:
   deciding (814) to remove the first cell from the multicast stream; and
   ceasing transmission of the multicast stream in the first cell.

9. The method of embodiment 8, wherein deciding (814) to remove the first cell from the multicast stream comprises determining that no UE to receive the multicast stream remains in the first cell.

10. The method of any of embodiments 1 to 9, wherein the multicast stream is provided (806) by a User Plane Function, UPF.

11. The method of any of embodiments 1 to 10, wherein the multicast stream is provided (806) by an Internet Protocol, IP, multicast.

12. The method of any of embodiments 1 to 11, wherein the preparation notification is further provided (802) to all neighboring radio access nodes of the first radio access node in response to joining (800) the multicast transmission session.

13. The method of any of embodiments 1 to 11, wherein the preparation notification is further provided (802) to a subset of all neighboring radio access nodes of the first radio access node in response to joining (800) the multicast transmission session.

14. The method of any of embodiments 1 to 13, further comprising identifying the second radio access node as a neighboring radio access node.

15. The method of embodiment 14, wherein the second radio access node is identified as a neighboring radio access node by Automatic Neighbor Relation, ANR, manual configuration, or both ANR and manual configuration.

16. The method of any of embodiments 14 to 15, wherein neighboring radio access nodes are identified based on at least one of cell location, UE location, or a determined handover probability during the multicast transmission session.

17. The method of any of embodiments 1 to 16, further comprising, in response to a determination (808) for the second radio access node to begin transmitting the multicast stream, providing scheduling information, synchronization information, or both scheduling information and synchronization information to the second radio access node.

18. The method of embodiment 17, further comprising making the determination (808) for the second radio access node to begin transmitting the multicast stream.

19. The method of embodiment 17, further comprising receiving the determination (808) for the second radio access node to begin transmitting the multicast stream from the second radio access node or another node in the RAN.

20. A method performed by a first radio access node (e.g., gNB1) in a Radio Access Network, RAN, for providing adaptive service areas in a multicast transmission session, the method comprising:
   participating (900) in a multicast transmission session, comprising a multicast stream transmitted at least by the first radio access node to one or more User Equipment, UE, in a first cell;
   forwarding (904) service packets of the multicast stream to a second radio access node (e.g., gNB2) neighboring the first radio access node; and
   providing (906) a preparation notification to the second radio access node, the preparation notification comprising session information for the multicast transmission session.

21. The method of embodiment 20, wherein the session information comprises at least one of a Temporary Mobile Group Identity, TMGI, or an address for the multicast stream.

22. The method of any of embodiments 20 to 21, further comprising deciding (902) to include the second radio access node in the multicast transmission session.

23. The method of embodiment 22, wherein deciding (902) to include the second radio access node in the multicast transmission session is based on a radio condition in the RAN comprising the first radio access node and the second radio access node.

24. The method of embodiment 23, wherein the radio condition comprises a signal strength for a UE having a Temporary Mobile Group Identity, TMGI, associated with the multicast transmission session.

25. The method of any of embodiments 22 to 24, wherein deciding (902) to include the second radio access node in the multicast transmission session comprises determining that a UE receiving the multicast stream has entered or is about to enter a second cell of the second radio access node.

26. The method of any of embodiments 20 to 25, further comprising:
   deciding (920) to remove the first cell from the multicast stream; and
   ceasing transmission of the multicast stream in the first cell.

27. The method of embodiment 26, wherein deciding (920) to remove the first cell from the multicast stream comprises determining that no UE to receive the multicast stream remains in the first cell.

28. The method of any of embodiments 20 to 27, wherein the multicast stream is provided (900a) by a User Plane Function, UPF.

29. The method of any of embodiments 20 to 28, wherein the multicast stream is provided (900a) by an Internet Protocol, IP, multicast.

30. The method of any of embodiments 20 to 29, further comprising:
   making a determination (902) for the second radio access node to join the multicast transmission session;
   providing (906) the preparation notification to the second radio access node in response to the determination (902) for the second radio access node to join the multicast transmission session; and
   forwarding (904) the service packets of the multicast stream to the second radio access node in response to the determination (902) for the second radio access node to join the multicast transmission session.

31. The method of embodiment 30, further comprising providing scheduling information, synchronization information, or both scheduling information and synchronization information to the second radio access node in response to the determination (902) for the second radio access node to join the multicast transmission session.

32. The method of any of embodiments 20 to 31, further comprising ceasing forwarding the service packets of the multicast stream to the second radio access node in response to receiving (914) a stop notification indicating that the second radio access node has joined the multicast transmission session.

33. A method performed by a second radio access node (e.g., gNB2) in a Radio Access Network, RAN, for adaptively joining a multicast stream, the method comprising:
   receiving (802) a preparation notification from a neighboring first radio access node (e.g., gNB1) in the RAN, the preparation notification comprising session information for a multicast transmission session having a multicast stream transmitted at least by the first radio access node in a first cell;
   joining (804) the multicast transmission session using the session information; and
   transmitting (812) the multicast stream to one or more User Equipment, UE, in a second cell of the second radio access node.

34. The method of embodiment 33, wherein the session information comprises at least one of a Temporary Mobile Group Identity, TMGI, or an address for the multicast stream.

35. The method of embodiment 34, wherein joining (804) the multicast transmission session comprises joining a multicast group associated with the TMGI.

36. The method of any of embodiment 33 to 35, further comprising receiving (806) the multicast stream from a User Plane Function, UPF, after joining (804) the multicast transmission session.

37. The method of embodiment 36, wherein joining (804) the multicast transmission session further comprises requesting the multicast stream from the UPF in response to the preparation notification.

38. The method of any of embodiments 33 to 37, further comprising receiving (806) the multicast stream from an Internet Protocol, IP, multicast after joining (804) the multicast transmission session.

39. The method of any of embodiments 33 to 38, further comprising deciding (808) to include the second radio access node in the multicast transmission session.

40. The method of embodiment 39, wherein deciding (808) to include the second radio access node in the multicast transmission session is based on a radio condition in the RAN comprising the first radio access node and the second radio access node.

41. The method of embodiment 40, wherein the radio condition comprises a signal strength for a UE having a Temporary Mobile Group Identity, TMGI, associated with the multicast stream.

42. The method of any of embodiments 39 to 41, wherein deciding (808) to include the second radio access node in the multicast transmission session comprises determining that a UE receiving the multicast stream has entered or is about to enter the second cell.

43. The method of any of embodiments 33 to 42, further comprising receiving (808) scheduling information, synchronization information, or both scheduling information and synchronization information from the RAN after joining (804) the multicast transmission session.

44. The method of embodiment 43, wherein the multicast stream is unpacked (810) and transmitted (812) in the second cell in response to receiving (808) the scheduling information, synchronization information, or both scheduling information and synchronization information.

45. The method of any of embodiments 43 to 44, further comprising receiving (806) the multicast stream without processing or transmitting the multicast stream until the scheduling information, synchronization information, or both scheduling information and synchronization information is received (808).

46. The method of any of 43 to 45, wherein the scheduling information, synchronization information, or both scheduling information and synchronization information is received (808) from the first radio access node.

47. The method of any of embodiments 43 to 46, wherein the scheduling information, synchronization information, or both scheduling information and synchronization information is received (808) from another node in the RAN.

48. A method performed by a second radio access node (e.g., gNB2) in a Radio Access Network, RAN, for adaptively joining a multicast stream, the method comprising:
   receiving (906) a preparation notification from a neighboring first radio access node (e.g., gNB1) in the RAN, the preparation notification comprising session information for a multicast transmission session having a multicast stream transmitted at least by the first radio access node in a first cell;
   joining (910) the multicast transmission session using the session information in response to receiving (906) the preparation notification; and
   transmitting (918) the multicast stream to one or more User Equipment, UE, in a second cell of the second radio access node in response to receiving (906) the preparation notification.

49. The method of embodiment 48, wherein the session information comprises at least one of a Temporary Mobile Group Identity, TMGI, or an address for the multicast stream.

50. The method of embodiment 49, wherein joining (910) the multicast transmission session comprises joining a multicast group associated with the TMGI.

51. The method of any of embodiment 48 to 50, further comprising receiving (912) the multicast stream from a User Plane Function, UPF, after joining (910) the multicast transmission session.

52. The method of embodiment 51, wherein joining (910) the multicast transmission session further comprises requesting the multicast stream from the UPF in response to the preparation notification.

53. The method of any of embodiments 48 to 52, further comprising receiving (912) the multicast stream from an Internet Protocol, IP, multicast after joining (910) the multicast transmission session.

54. The method of any of embodiments 48 to 53, further comprising receiving (904) forwarded service packets for the multicast stream from the first radio access node.

55. The method of embodiment 54, further comprising transmitting (908) the forwarded service packets in the second cell until the multicast stream is received (912) from a User Plane Function, UPF.

56. The method of any of embodiments 54 to 55, further comprising providing (914) a stop notification to the first radio access node when the multicast stream is received (912) from a User Plane Function, UPF.

57. A radio access node (e.g., gNB1, gNB2) in a cellular Radio Access Network, RAN, for adaptively changing multicast areas in a multicast transmission session, the radio access node configured to perform the method of any of embodiments 1 to 56.

58. The radio access node of embodiment 57, comprising:
   a radio interface; and
   processing circuitry configured to perform the method of any of embodiment 1 to 56.

ABBREVIATIONS

At least some of the following abbreviations may be used in this disclosure. If there is an inconsistency between abbreviations, preference should be given to how it is used above. If listed multiple times below, the first listing should be preferred over any subsequent listing(s).
   3GPP Third Generation Partnership Project
   5G Fifth Generation
   5GC Fifth Generation Core
   5GS Fifth Generation System
   AF Application Function
   AMF Access and Mobility Management Function
   AN Access Network
   AP Access Point
   AS Application Server
   AUSF Authentication Server Function
   BM-SC Broadcast Multicast—Service Center
   BSC Base Station Controller
   BTS Base Transceiver Station
   DN Data Network
   DU Distributed Unit
   E2E End-to-End
   eMBMS Evolved or Enhanced Multimedia Broadcast/Multicast Service
   eNB Enhanced or Evolved Node B
   EPC Evolved Packet Core
   EPS Evolved Packet System
   E-SMLC Evolved Serving Mobile Location Center
   GCS Group Communication Service
   GCSE Group Communication System Enabler
   gNB New Radio Base Station
   GSM Global System for Mobile Communications
   HL Higher Layer
   HSS Home Subscriber Server
   IoT Internet of Things
   IP Internet Protocol
   LTE Long Term Evolution
   M2M Machine-to-Machine
   MANO Management and Orchestration
   MBSFN Multimedia Broadcast Single Frequency Network
   MC Mission Critical
   MCData Mission Critical Data
   MCE Multi-Cell/Multicast Coordination Entity
   MCGC Mission Critical Group Communication
   MC-PTM Multi-Cell Point-to-Multipoint
   MCPTT Mission-Critical Push-to-Talk
   MME Mobility Management Entity
   MSC Mobile Switching Center
   M-SMF Multicast Session or Service Management Function
   MT Mobile Terminated MTC Machine Type Communication
MTM Multipoint-to-Multipoint
MTP Multipoint-to-Point
M-UPF Multicast User Plane Function
NB-IoT Narrowband Internet of Things
NEF Network Exposure Function
NF Network Function
NFV Network Function Virtualization
NR New Radio
NRF Network Function Repository Function
NSSF Network Slice Selection Function
O&M Operation and Maintenance
OSS Operations Support System
PCF Policy Control Function
P-GW Packet Data Network Gateway
PTM Point-to-Multipoint
PTP Point-to-Point
QoS Quality of Service
RAN Radio Access Network
RAT Radio Access Technology
RNC Radio Network Controller
SAI Service Area Identifier
SCEF Service Capability Exposure Function
SC-PTM Single Cell Point-to-Multipoint
SMF Session Management Function
SON Self-Organizing Network
TA Tracking Area
TAU Tracking Area Update
TMGI Temporary Mobile Group Identity
UDM Unified Data Management
UE User Equipment
UPF User Plane Function
VNE Virtual Network Element
VNF Virtual Network Function
VoIP Voice over Internet Protocol
WCDMA Wideband Code Division Multiple Access
WiMax Worldwide Interoperability for Microwave Access
Xn Network Interface Between Radio Access Nodes (e.g., gNBs)

Those skilled in the art will recognize improvements and modifications to the embodiments of the present disclosure. All such improvements and modifications are considered within the scope of the concepts disclosed herein.

The invention claimed is:

1. A method performed by a first radio access node in a Radio Access Network, RAN, for providing adaptive service areas in a multicast transmission session, the method comprising:
participating in a multicast transmission session for a service, comprising a multicast stream currently transmitted at least by the first radio access node to one or more User Equipment, UE, in a first cell;
providing, when a RAN decision is made to include cells of the first radio access node in the transmission of the service, a preparation notification to a second radio access node neighboring the first radio access node to prepare for mobility of the one or more UE to the neighbor second radio access node, the preparation notification comprising session information to prepare for the multicast transmission session for the service; and
deciding to include the second radio access node in the multicast transmission session, deciding to include the second radio access node in the multicast transmission session being based on a radio condition in the RAN comprising the first radio access node and the second radio access node, the radio condition including a signal strength for a UE having a Temporary Mobile Group Identity, TMGI, associated with the multicast transmission session.

2. The method of claim 1, further comprising joining the multicast transmission session; wherein the preparation notification is provided to the second radio access node in response to joining the multicast transmission session.

3. The method of claim 1, wherein the session information comprises at least one of a Temporary Mobile Group Identity, TMGI, or an address for the multicast stream.

4. The method of claim 1, wherein deciding to include the second radio access node in the multicast transmission session comprises determining that a UE receiving the multicast stream has entered or is about to enter a second cell of the second radio access node.

5. The method of claim 1, further comprising:
deciding to remove the first cell from the multicast stream; and
ceasing transmission of the multicast stream in the first cell.

6. The method of claim 5, wherein deciding to remove the first cell from the multicast stream comprises determining that no UE to receive the multicast stream remains in the first cell.

7. The method of claim 1, wherein the multicast stream is provided by a User Plane Function, UPF.

8. The method of claim 1, wherein the multicast stream is provided by an Internet Protocol, IP, multicast.

9. The method of claim 1, wherein the preparation notification is further provided to all neighboring radio access nodes of the first radio access node in response to joining the multicast transmission session.

10. The method of claim 1, wherein the preparation notification is further provided to a subset of all neighboring radio access nodes of the first radio access node in response to joining the multicast transmission session.

11. The method of claim 1, further comprising identifying the second radio access node as a neighboring radio access node.

12. The method of claim 11, wherein the second radio access node is identified as a neighboring radio access node by Automatic Neighbor Relation, ANR, manual configuration, or both ANR and manual configuration.

13. The method of claim 11, wherein neighboring radio access nodes are identified based on at least one of cell location, UE location, or a determined handover probability during the multicast transmission session.

14. The method of claim 1, further comprising, in response to a determination for the second radio access node to begin transmitting the multicast stream, providing scheduling information, synchronization information, or both scheduling information and synchronization information to the second radio access node.

15. The method of claim 14, further comprising making the determination for the second radio access node to begin transmitting the multicast stream.

16. The method of claim 14, further comprising receiving the determination for the second radio access node to begin transmitting the multicast stream from the second radio access node or another node in the RAN.

17. A method performed by a second radio access node in a Radio Access Network, RAN, for adaptively joining a multicast stream, the method comprising:
receiving, when a RAN decision is made to include cells of the first radio access node in the transmission of the service, a preparation notification from a neighboring first radio access node in the RAN to prepare for mobility of one or more UE from the neighbor first radio access node, the preparation notification comprising session information to prepare for a multicast transmission session for a service having a multicast stream transmitted at least by the first radio access node to said one or more UE in a first cell;

joining the multicast transmission session using the session information;

transmitting the multicast stream for the service to one or more User Equipment, UE, in a second cell of the second radio access node; and deciding to include the second radio access node in the multicast transmission session, deciding to include the second radio access node in the multicast transmission session being based on a radio condition in the RAN comprising the first radio access node and the second radio access node, the radio condition including a signal strength for a UE having a Temporary Mobile Group Identity, TMGI, associated with the multicast transmission session.

18. The method of claim 17, wherein the session information comprises at least one of a Temporary Mobile Group Identity, TMGI, or an address for the multicast stream.

19. The method of claim 18, wherein joining the multicast transmission session comprises joining a multicast group associated with the TMGI.

20. The method of claim 17, further comprising receiving the multicast stream from a User Plane Function, UPF, after joining the multicast transmission session.

21. The method of claim 20, wherein joining the multicast transmission session further comprises requesting the multicast stream from the UPF in response to the preparation notification.

22. The method of claim 17, further comprising receiving the multicast stream from an Internet Protocol, IP, multicast after joining the multicast transmission session.

23. The method of claim 17, wherein deciding to include the second radio access node in the multicast transmission session comprises determining that a UE receiving the multicast stream has entered or is about to enter the second cell.

24. The method of claim 17, further comprising receiving scheduling information, synchronization information, or both scheduling and synchronization information from the RAN after joining the multicast transmission session.

25. The method of claim 24, wherein the multicast stream is unpacked and transmitted in the second cell in response to receiving the scheduling information, synchronization information, or both scheduling information and synchronization information.

26. The method of claim 24, further comprising receiving the multicast stream without processing or transmitting the multicast stream until the scheduling information, synchronization information, or both scheduling information and synchronization information is received.

27. The method of claim 24, wherein the scheduling information, synchronization information, or both scheduling information and synchronization information is received from the first radio access node.

28. The method of claim 24, wherein the scheduling information, synchronization information, or both scheduling information and synchronization information is received from another node in the RAN.

29. A radio access node in a cellular Radio Access Network, RAN, for adaptively changing multicast areas in a multicast transmission session, the radio access node comprising:

a radio interface; and processing circuitry configured cause the radio access node to:

participate in a multicast transmission session for a service, comprising a multicast stream currently transmitted at least by the first radio access node to one or more User Equipment, UE, in a first cell;

provide, when a RAN decision is made to include cells of the first radio access node in the transmission of the service, a preparation notification to a second radio access node neighboring the first radio access node to prepare for mobility of the one or more UE to the neighbor second radio access node, the preparation notification comprising session information to prepare for the multicast transmission session for the service; and decide to include the second radio access node in the multicast transmission session, deciding to include the second radio access node in the multicast transmission session being based on a radio condition in the RAN comprising the first radio access node and the second radio access node, the radio condition including a signal strength for a UE having a Temporary Mobile Group Identity, TMGI, associated with the multicast transmission session.

\* \* \* \* \*